United States Patent
Schottland et al.

(10) Patent No.: US 11,316,900 B1
(45) Date of Patent: Apr. 26, 2022

(54) SYSTEM AND METHOD FOR AUTOMATICALLY PRIORITIZING RULES FOR CYBER-THREAT DETECTION AND MITIGATION

(71) Applicant: FireEye, Inc., Milpitas, CA (US)

(72) Inventors: Paul Schottland, Charlotte, NC (US); Chinmoy Dey, Bangalore (IN); Christopher Glyer, Arlington, VA (US)

(73) Assignee: FireEye Security Holdings Inc., Milpitas, CA (US)

(*) Notice: Subject to any disclaimer, the term of this patent is extended or adjusted under 35 U.S.C. 154(b) by 630 days.

(21) Appl. No.: 16/353,988

(22) Filed: Mar. 14, 2019

Related U.S. Application Data

(60) Provisional application No. 62/692,584, filed on Jun. 29, 2018.

(51) Int. Cl.
*H04L 29/06* (2006.01)
*G06F 9/50* (2006.01)

(52) U.S. Cl.
CPC .......... *H04L 63/20* (2013.01); *G06F 9/50* (2013.01); *H04L 63/1416* (2013.01)

(58) Field of Classification Search
None
See application file for complete search history.

(56) References Cited

U.S. PATENT DOCUMENTS 4,292,580 A  9/1981  Ott et al.
5,175,732 A  12/1992  Hendel et al.
(Continued)

FOREIGN PATENT DOCUMENTS

GB  2439806 A  1/2008
GB  2490431 A  10/2012
(Continued)

OTHER PUBLICATIONS

"Mining Specification of Malicious Behavior"—Jha et al, UCSB, Sep. 2007 https://www.cs.ucsb.edu/.about.chris/research/doc/esec07.sub.--mining.pdf-.
(Continued)

*Primary Examiner* — Yogesh Paliwal
*Assistant Examiner* — Hassan Saadoun
(74) *Attorney, Agent, or Firm* — Rutan & Tucker, LLP

(57) ABSTRACT

A system and computerized method for generating an improved cyber-security rule ordering for cyber-security threat detection or post-processing activities conducted by a rules-based cyber-security engine deployed within a network device is described. Herein, historical metadata associated with analytics conducted on incoming data by a rule-based cyber-security engine and in accordance with a plurality of rules is described. These rules are arranged in a first ordered rule sequence. The historical metadata is analyzed to determine one or more salient rules from the plurality of rules. The plurality of rules are reprioritized by at least rearranging an order to a second ordered rule sequence with the one or more salient rules being positioned toward a start of the second ordered rule sequence. Thereafter, the rule-based cyber-security engine operates in accordance with the reprioritized rule set that is arranged in the second ordered rule sequence to achieve improved performance.

25 Claims, 10 Drawing Sheets

(56) References Cited

U.S. PATENT DOCUMENTS

| | | |
|---|---|---|
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowland |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B2 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |

(56) References Cited

U.S. PATENT DOCUMENTS

| | | |
|---|---|---|
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,521,115 B1 * | 12/2016 | Woolward .......... H04L 63/1416 |
| 9,536,091 B2 | 1/2017 | Paithane et al. |
| 9,537,972 B1 | 1/2017 | Edwards et al. |
| 9,560,059 B1 | 1/2017 | Islam |
| 9,560,081 B1 * | 1/2017 | Woolward .......... H04L 63/0263 |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,639 B1 * | 10/2017 | Sun .................. H04L 63/20 |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |

(56) References Cited

U.S. PATENT DOCUMENTS

| | | |
|---|---|---|
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |

(56) References Cited

U.S. PATENT DOCUMENTS

| | | |
|---|---|---|
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301755 A1* | 12/2008 | Sinha .................... H04L 63/20 726/1 |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Proves et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0011560 A1* | 1/2012 | Natarajan ............. G06F 21/604 726/1 |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |

(56) References Cited

U.S. PATENT DOCUMENTS

| | | |
|---|---|---|
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |
| 2019/0306118 A1* | 10/2019 | Guo ................. H04L 63/20 |
| 2020/0007546 A1* | 1/2020 | Valiquette ........... H04L 63/20 |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.sp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).

Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

(56) References Cited

OTHER PUBLICATIONS

Cisco "Intrusion Prevention for the Cisco ASA 5500-x Series" Data Sheet (2012).
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", in Proceedings of the 12th Annual Network and Distributed System Security, Symposium (NDSS '05), (Feb. 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham , "Insertion, Evasion, and Denial of Service: Eluding Network Intrusion Detection", Secure Networks, ("Ptacek"), (Jan. 1998).
Venezia, Paul , "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

FIG. 2B

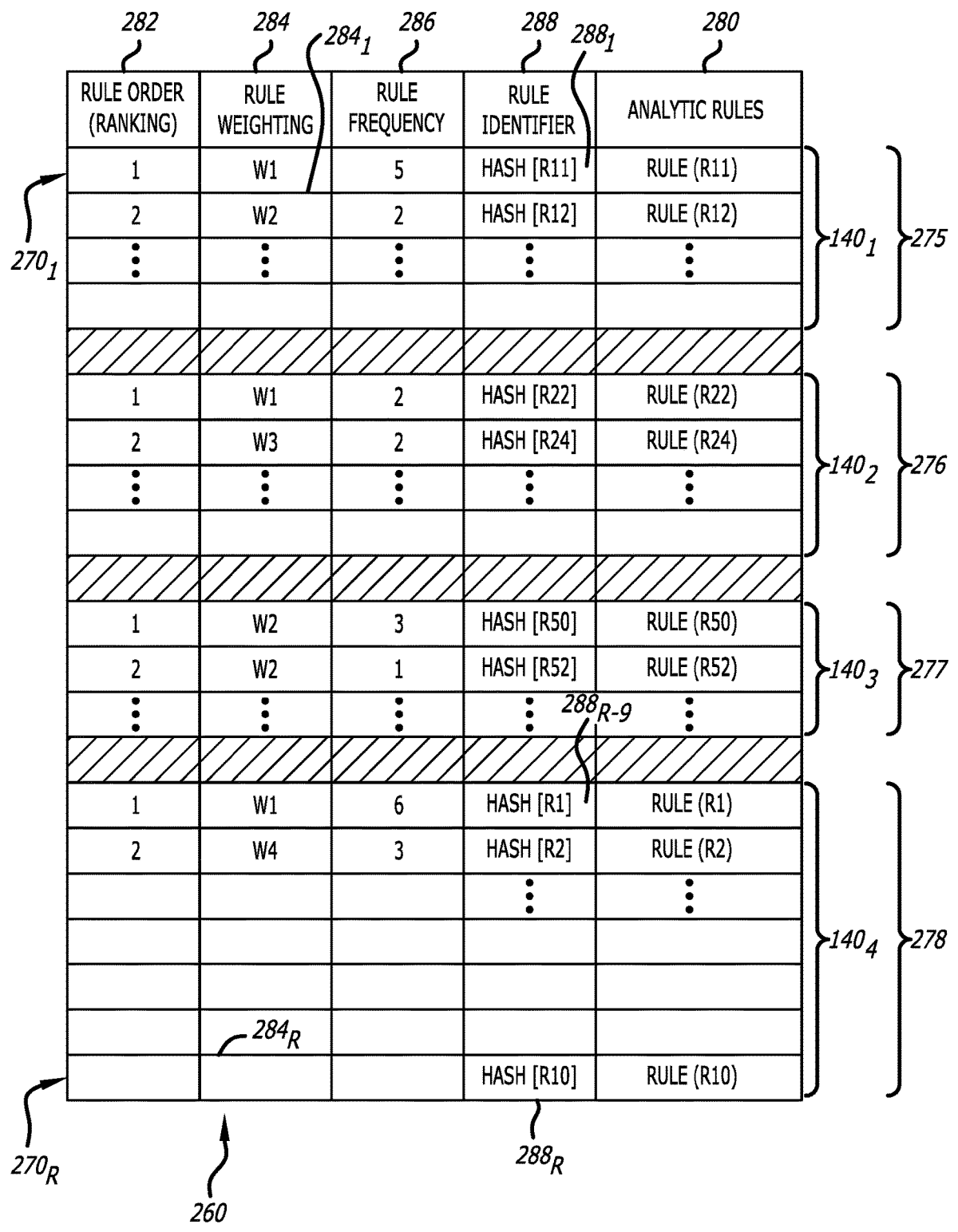

| RULE ORDER (RANKING) | RULE WEIGHTING | RULE FREQUENCY | RULE IDENTIFIER | ANALYTIC RULES |
|---|---|---|---|---|
| 1 | W1 | 5 | HASH [R11] | RULE (R11) |
| 2 | W2 | 2 | HASH [R12] | RULE (R12) |
| ⋮ | ⋮ | ⋮ | ⋮ | ⋮ |
| | | | | |
| ///// | ///// | ///// | ///// | ///// |
| 1 | W1 | 2 | HASH [R22] | RULE (R22) |
| 2 | W3 | 2 | HASH [R24] | RULE (R24) |
| ⋮ | ⋮ | ⋮ | ⋮ | ⋮ |
| | | | | |
| ///// | ///// | ///// | ///// | ///// |
| 1 | W2 | 3 | HASH [R50] | RULE (R50) |
| 2 | W2 | 1 | HASH [R52] | RULE (R52) |
| ⋮ | ⋮ | ⋮ | ⋮ | ⋮ |
| ///// | ///// | ///// | ///// | ///// |
| 1 | W1 | 6 | HASH [R1] | RULE (R1) |
| 2 | W4 | 3 | HASH [R2] | RULE (R2) |
| | | | ⋮ | ⋮ |
| | | | | |
| | | | | |
| | | | | |
| | | | | |
| | | | HASH [R10] | RULE (R10) |

FIG. 2C

| RULE ORDER (RANKING) | RULE WEIGHTING | RULE FREQUENCY | RULE IDENTIFIER | ANALYTIC RULES |
|---|---|---|---|---|
| | | | | |
| | | | | |
| | | | | |
| | | | | |
| ///// | ///// | ///// | ///// | ///// |
| | | | | |
| | | | | |
| | | | | |
| | | | | |
| ///// | ///// | ///// | ///// | ///// |
| | | | | |
| | | | | |
| ///// | ///// | ///// | ///// | ///// |
| 1 | | | HASH [R8] | RULE 8 (R8) |
| 2 | | | HASH [R7] | RULE 7 (R7) |
| 3 | | | HASH [R4] | RULE 4 (R4) |
| 1 | | | HASH [R3] | RULE 3 (R3) |
| 2 | | | ⋮ | ⋮ |
| ⋮ | | | | |

282 — RULE ORDER (RANKING)
284 — RULE WEIGHTING
286 — RULE FREQUENCY
288 — RULE IDENTIFIER
280 — ANALYTIC RULES 275, 276, 277, 278

GEOGRAPHIC 1 OR INDUSTRY 1 — 290
GEOGRAPHIC 2 OR INDUSTRY 2 — 292

$288_R$

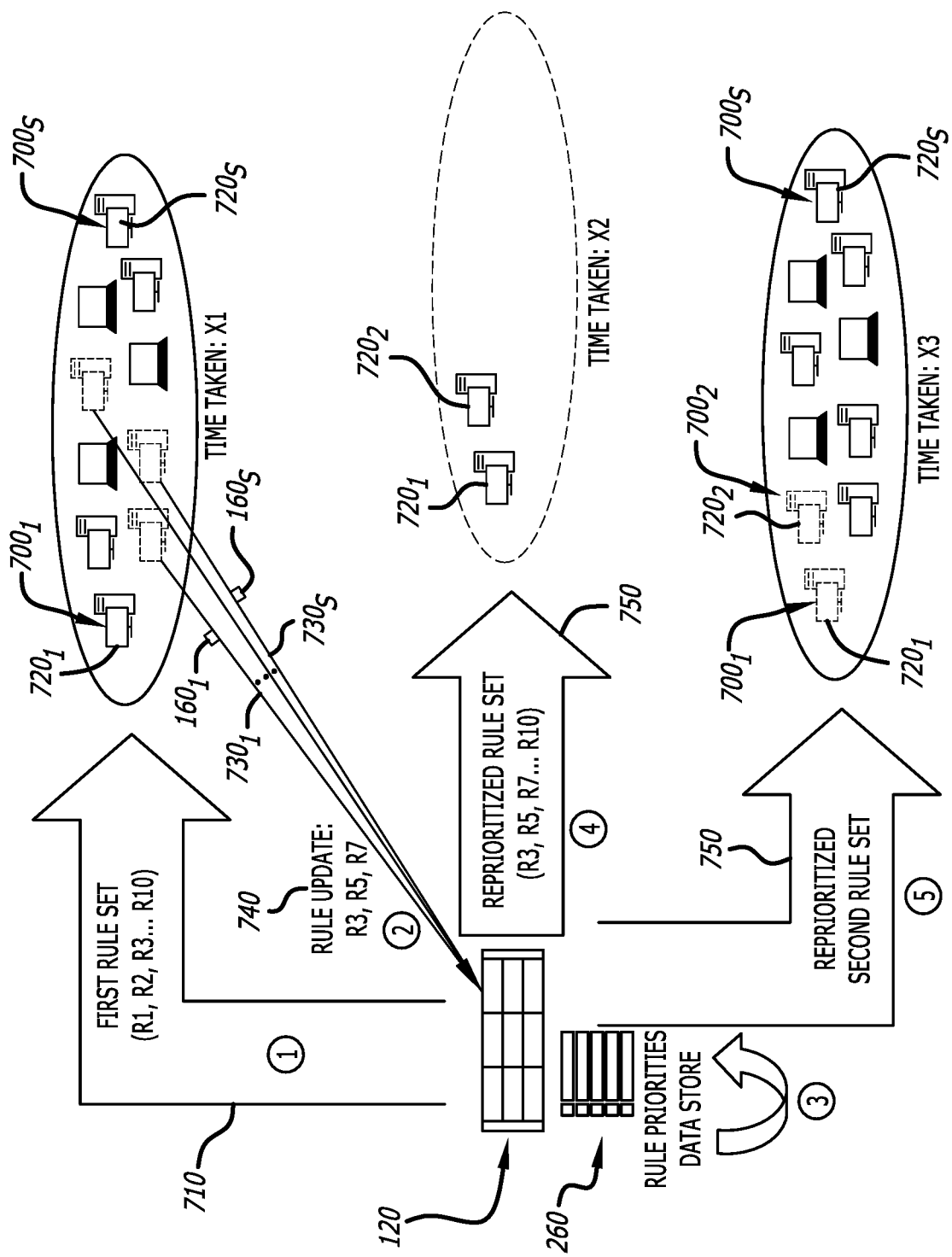

SYSTEM AND METHOD FOR AUTOMATICALLY PRIORITIZING RULES FOR CYBER-THREAT DETECTION AND MITIGATION

CROSS REFERENCE TO RELATED APPLICATIONS

This application is based upon and claims the benefit of priority from U.S. Provisional Patent Application No. 62/692,584 filed Jun. 29, 2018, the entire contents of which are incorporated herein by reference.

Embodiments of the disclosure relate to cyber-security. More particularly, one embodiment of the disclosure relates to a system and corresponding method for dynamically reprioritizing the use of analytic rules in controlling cyber-security threat detection to enhance resource utilization and accelerating the review and detection of higher priority artifacts dynamically.

GENERAL BACKGROUND

Network and networked devices provide useful and necessary services that assist individuals in business and in their everyday lives. Given the growing dependence on these services, increased measures have been undertaken to protect the network devices against cyberattacks. In some cases, these cyberattacks are orchestrated in an attempt to gain access to content stored on one or more network devices. Such access is for illicit (i.e., unauthorized) purposes, such as spying or other malicious or nefarious activities that may be achieved through the uploading of malicious software. Other cyberattacks may be directed to adversely influence the operability of a network device such as precluding functionality of the network device or precluding access to certain stored files unless payment is made (ransomware), a forced loading of an unwanted, non-malicious software that utilizes resources within the network device, a loading of spyware in efforts to exfiltrate data (e.g., intellectual property, etc.), or the like.

For protection, network devices (e.g., computer, Internet of Things "IoT" devices, point-of-sale consoles, ATMs, and similar networked and network devices) may be deployed with rule-based cyber-security software that, under control of installed threat detection rules, attempts to detect cyber-attacks caused by malicious objects being uploaded. The cyber-security software is coded to perform analytics on received objects, where the order of such analytics is precisely controlled and coincides with the processing order of the threat detection rules. Unfortunately, many conventional rule-based cyber-security software such as a software (e.g., process or daemon) agent operating in the background of a computer for example, the software agent analyzes incoming objects in accordance with a prescribed order of analysis, which is set by the threat detection rules at the time of manufacture and reset during a security content update (e.g., security software update, etc.) Thereafter, the order of analysis is changed infrequently, normally the threat detection rules remain unchanged until a software update is provided to the computer. As a result, some threat detection analyses may not account for recent, real-time findings encountered during cyberattack detection analyses performed to monitor an ever-changing threat landscape.

Currently, this lack of a timely reordering of the detection rules has resulted in inefficient use of analysis resources and concomitant delays in uncovering threats, which is especially true for highly targeted scenarios, wherein a threat actor specifically targets and uses company-specific (rather than generic) software or exploits in software to accomplish the criminals intent against a specific company. In computers, where threat detection must occur during normal operation, any delayed threat detection attributable to legacy rule processing ordering may result in a failure to detect a cyberattack. The failure or delay (even for seconds or less) in detecting a cyberattack may cause irreparable harm to the compromised computer or to the network deploying the computer as the cyberattack may spread to other network devices and resources. For example, once a company's server is effectively infected and controlled by ransomware, then the company's server may have irreparable damage to processes and transactions which were not captured within a backup or other fault tolerance device(s) for the company.

BRIEF DESCRIPTION OF THE DRAWINGS

Embodiments of the disclosure are illustrated by way of example and not by way of limitation in the figures of the accompanying drawings, in which like references indicate similar elements and in which:

FIG. 2B is an exemplary embodiment of a data structure of a rule priorities data store implemented within the management system of FIG. 2A.

FIG. 2C is an exemplary embodiment of a data structure of the rule priorities data store with a rule group further organized into two or more rule subgroups.

FIG. 7 is an illustrative embodiment an operational flow performed by the management system of FIG. 1 in reprioritizing rules controlling operations of a particular cyber-security engine (e.g., software agent) deployed within each of a plurality of network devices.

DETAILED DESCRIPTION

I. Overview

Figure 1:
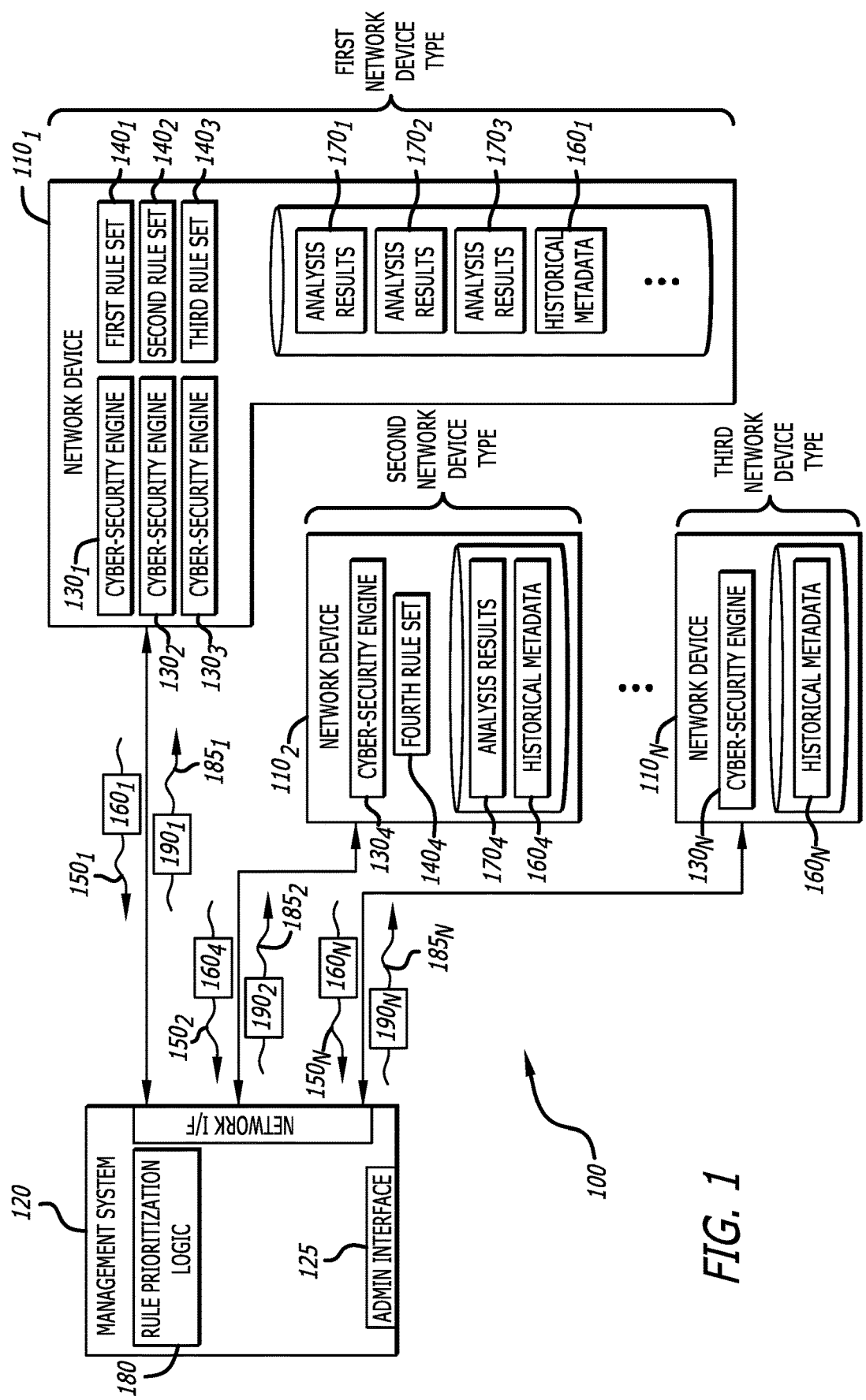
FIG. 1 is an exemplary block diagram of an embodiment of an automated, cyber-security protection service.

A cyber-security system to dynamically reprioritize the utilization of analytic rules forming a rule set with improved efficacy in identifying malicious or non-malicious content and/or improved efficiency in identifying or classifying malicious or non-malicious content is described. Herein, the analytic rules may include detection rules that control operability of threat analysis logic, represented by various types of rule-based cyber-security engines, in (i) detecting one or more indicators of compromise (IOCs) and/or (ii) classifying an object under analysis as malicious (e.g., the likelihood of the object being part of a cyberattack exceeds a first threshold such as a first probability or initial behavioral trigger) or non-malicious (e.g., the likelihood of the object being part of a cyberattack is less than a second threshold such as a second probability that is less than the first probability). The detection rules may be utilized by rule-based cyber-security engines such as a static analysis engine, a dynamic (or behavioral) analysis engine, a correlation/classification engine, a software agent, or the like. Hence, the detection rules may include, but are not restricted or limited to: monitoring rules for targeting certain content within an object for static analysis, static analyzing rules to evaluate maliciousness of an object without its execution, monitoring rules for targeting certain behaviors for behavioral analysis, behavioral analyzing rules to evaluate maliciousness of an object during execution, and/or correlation/classification rules to render a verdict as to whether the object is malicious or non-malicious based on the results provided by the static analysis and/or dynamic analysis.

For illustrative purposes only, one embodiment of the cyber-security system may include logic that analyzes unique binaries executing within an specific customer enterprise and utilizes detection rules and detection rule modification. Another embodiment may involve the evaluation of a binary to other known 'goodware' or 'badware,' while another embodiment could be an application, which is not commonly used to generate a behavior identified as suspicious, each may trigger an evaluation across dimensions which create a unique category of artifact which could be identified as potentially a 'class' of issue which is evaluated for evil (e.g., malicious) or (e.g., non-malicious) intent in an enterprise or specific customer segment, or geography or other segmentation.

Additionally, besides the detection rules described above, the analytic rules may include post-processing rules that control post-processing activities such as (i) controlling the reporting/alerting based on results produced by the rule-based cyber-security engines and/or (ii) performing remediation activities. The post-processing rules may be utilized by rule-based cyber-security engines such as reporting engines, or the like. Hence, the post-processing rules may include, but are not restricted or limited to alert and reporting rules, remediation rules, or the like.

As described herein, a "rule" may be broadly construed as software or data that is used in detection of cyberattacks. According to one embodiment of the disclosure, each rule is configured to specify a conditional logic statement or programmatic entity used in the cyber-security system during operation in detecting and classifying cyberattacks. Rules may be received and maintained by the cyber-security system in files, libraries, directories, or other modular programmatic structures, or may be integrated into logic running within the cyber-security systems for example such as in their operating software. Importantly, in embodiments of the disclosure, these cyber-security rules may be individually modified or a set of rules may be selected and/or modified (reordered, etc.) for use in the cyber-security engine during runtime to adjust operability of the cyber-security engine and influence cyber-security verdicts.

For instance, as one illustrative example, some detection rules may be logic for use in detecting a cyberattack, each capable of being represented as a logical expression for example, an "if this, then that" conditional statement, where "this" represents a condition and "that" represents the conclusion (e.g., an observed characteristic, an observed behavior, a determined classification as malicious or not malicious, etc.). The condition may encompass, for example, a signature, heuristic, pattern, string or value. The conclusion is applied when the condition is satisfied. As another illustrative example, some detection rules may provide configuration information containing parameter values for configuring the operating software of the cyber-security system, such as, for example, threshold values used in detection (e.g., specifying the threshold for suspiciousness and maliciousness).

Different types of analyses may be configured to utilize different types of rule sets. For instance, signature-based rule sets may be used by a static analysis engine to determine whether a hash (or other signature of an event) matches a stored library of signatures (e.g., exploit, vulnerability or fingerprint-type signatures). Likewise, execution anomaly rule sets may be used by a dynamic analysis engine to determine whether, during execution of an object, observed activities and behaviors are expected or anomalous. Also, classification rule sets may be used by a correlation/classification engine to determine verdicts, for example, based on weightings or scores for identified characteristics and behaviors. In addition, post-processing rule sets may include responsive activities that are designed to report/alert a security administrator of a potential cyberattack and/or perform necessary remediation of the object (e.g., quarantine, delete from storage, etc.).

Herein, rule sets may be stored in a rules store (e.g., a repository) in a memory of the cyber-security system (e.g., persistent memory) and the ordering of the rules within the rule sets may be updated (periodically or ad hoc aperiodically) in light of the prevailing threat landscape. The rule reordering may be distributed to the cyber-security systems in security content files or libraries, originating from, for example, a management system charged with optimize analytic rules used by the cyber-security systems. Such rule reordering is different from rule content updates where the content of the rules may change without regard to considering as to how the ordering of the rules effects efficacy and efficiency of the rule set, as described herein with regard to embodiments of the invention.

A "salient" rule denotes a rule that is statistically determinative in (i) effectively identifying or classifying malicious or non-malicious content (efficacy), and/or (ii) improving the effectiveness of the cyber-security engine in identifying or classifying the malicious or non-malicious content relative to the amount of resources expended to achieve that outcome. Hence, this "efficiency" has an inverse relationship with the amount of processing needed to identify or classify content as malicious or non-malicious (e.g., the number of rule analyses, amount of time needed, etc.). A rule is not considered "salient" when it provides minor (little to no) contributions in determining whether content is malicious or non-malicious.

Herein, the above-described dynamic rule reprioritization may involve the re-ordering of analytic rules based on cyber-security intelligence provided from (i) one or more network devices that detected a cyber-security threat (e.g., infected network device that experienced a recent cyberattack, a network device that successfully defended against a cyberattack, etc.), and/or (ii) a network administrator seeking to protect an enterprise against certain cyber-security threats that may be perpetrated against, for example, other companies or other industries. Reprioritization of the analytic rules, especially detection rules for example, may alter the weighting applied to the reordered detection rules within the rule set. Additionally, reprioritization of the analytic rules may be based, at least in part, on cyber-security intelligence pertaining to the frequency and persistence of analytic rules being stored and maintained within a rules priorities data store, as analytic rules relied upon with greater frequency and longevity tend to warrant "salient" designation. Various performance advantages, including resource-use efficiency, detection efficacy and efficiency (speed) in reaching a determination as to whether an object is malicious or non-malicious, may be achieved through the dynamic rule reprioritization scheme described below.

During operation, a cyber-security engine may locally store on its network device (e.g., an endpoint, a cyber-security appliance, a cyber-security sensor, etc.) metadata regarding rules implicated in prior cyber-security threats detected by the cyber-security engine (e.g., historical metadata and/or real-time metadata). In response to a triggering event, the network device may provide the metadata to a remote, centrally located management system containing rule prioritization logic that utilizes the metadata received from such network devices to dynamically reprioritize (e.g., re-order) analytic rules utilized by cyber-security engines similar in type to the cyber-security engine (e.g., software agents, dynamic analysis engine, etc.).

According to one embodiment of the disclosure, the rule prioritization logic is configured to (i) aggregate the (historical) metadata associated with analytics (e.g., results of analyses conducted by one or more rule-based cyber-security engines of similar type (e.g., software agents, static analysis engines, dynamic analysis engines, or correlation/classification engines, etc.), (ii) analyze the (historical) metadata in light of the current threat landscape (e.g., determine the determinative rules used to correctly reach a genuine verdict being a "true" positive or a "true" negative) to assist in identifying the "salient" analytic rules, and (iii) specify a reprioritization of the analytic rules (e.g., change rule ordering from a first rule sequence to a second rule sequence different than the first rule sequence) for use by the cyber-security engine(s) to optimize future threat analyses (e.g., resource-use efficiency such as a lesser number of rules are needed before a correct, definitive outcome is determined such as whether an object under analysis is malicious or non-malicious, detection efficacy, speed of analysis, etc.). For reprioritization, the salient analytic rules may be re-ordered earlier in the analysis cycle than their previous ordering (e.g., considered at or near the start of each analysis of an object), where the re-ordering of the analytic rules may alter the weighting of such rules (e.g., cause re-weighting). This alteration of the weighting (re-weighting) of the analytic rules, which is caused by the re-ordering of the analytic rules, may have more effect on the determination of whether an incoming object is a cyber-security threat or not. This reprioritization may take into account the probability of a particular threat associated with a rule occurring and the severity of that threat. For illustrative purposes, the analytic rules could come in many forms such as based on a customer's enterprise, or a geography, or an industry vertical; and if the analysis of the binary was determined to be good (e.g., non-malicious) or evil (e.g., malicious) as an artifact, the rules prioritization logic could use any or all of those as inputs to further produce weighting on an ultimate determination of good (e.g., non-malicious) or evil (e.g., malicious).

More specifically, as described below, a system is proposed to improve the efficiency of threat detection based on reprioritizing analytic rules utilized by rule-based cyber-security engines configured to detect and protect against a cyberattack. The system includes a management system communicatively coupled to receive metadata associated with analytic rules utilized by the rule-based cyber-security engines, which may be located within the same network device or different network devices. A rule-based cyber-security engine may be configured to process received analytic rules in efforts to detect indicators of compromise (e.g., suspicious or malicious characteristics or malicious behaviors) or classify analyzed content (e.g., content associated with an object) as malicious or non-malicious. Each rule-based cyber-security engine may include or communicate with scheduling logic, which specifies a prioritization in applying one or more rule sets in an analysis of content based on rule priority messages from the management system.

According to one embodiment of the disclosure, as briefly described above, each rule-based cyber-security engine may be configured to (i) determine what content of an object is to be analyzed, (ii) analyze the content of the object with or without its execution, (iii) determine what behavior or pattern of behaviors of the object are to be analyzed, (iv) analyze the behavior or pattern of behaviors of the object during execution, and/or (v) include also static analysis as an additional layer, and (vi) analyze results of the analyses on the content of the object and/or analyses of the monitored behavior or pattern of behaviors to reach a verdict. These operations are applied in accordance with one or more detection rule sets generated for each cyber-security engine type in efforts to assist the threat analysis logic in reaching a verdict quicker (e.g., less time, lesser number of rules analyzed, etc.). Additionally, one or more of the rule-based cyber-security engine may be configured with post-processing rule sets to determining a reporting procedure and/or types of alerts based on results produced by one of the rule-based cyber-security engines and/or perform remediation activities such as quarantine or delete content determined to be malicious. In general, these rule sets are directed to cyber-security threat analyses.

As described below, one type of network device, referred to as "endpoint," includes threat analysis logic implemented as a cyber-security engine configured as a software agent that, upon execution on the endpoint, may be adapted to identify malicious (or non-malicious content) and/or reach a verdict as to whether the object is a cyber-security threat. The network device may include The software agent further provides metadata, namely the results of its analyses conducted in accordance with current analytic rules, to the rule prioritization logic deployed within the management system. The rule prioritization logic analyzes the metadata (and metadata from any other cyber-security engines of similar type) and returns information identifying changes in prioritization of the current analytic rules.

Herein, the information identifying changes in prioritization of the current analytic rules is returned to the endpoint (and potentially other endpoints) as multicast or unicast messaging. Upon receipt of such information, scheduling logic within the endpoint effects reprioritization of the analytic rules (e.g., re-ordering into a different ordered sequence and/or re-weighting) for subsequent analyses. The reprioritization of the analytic rules utilized by the cyber-security engine(s) enables the more efficient analysis of content associated with an object by reducing the number of analysis cycles (e.g., number of rules being analyzed, amount of analysis time. etc.) necessary in identifying the content as malicious or non-malicious.

Different from an endpoint deployment, a cyber-security appliance may include threat analysis logic represented as multiple rule-based cyber-security engines. One type of rule-based cyber-security engine operates as a static analysis engine that, upon execution on the appliance, performs light-weight examinations of each incoming object to determine whether the incoming object is suspicious and/or malicious. These examinations may include a variety of different static analyses, where order of the analyses is controlled by the rule ordering that may be dependent on the type of object analyzed, such as a PDF document, Microsoft® WORD® document, an electronic mail (email) message, or the like. Additionally, or in the alternative, the static analysis engine may employ analysis techniques, including the use of application of heuristics or pattern matching, in order to detect and subsequently report or remediate unrecognizable (e.g., unknown) or known, malicious characteristics with or without execution of the object.

Herein, a change in prioritization of the analytic rules utilized by a static analysis engine may involve a change in the order of operations conducted during heuristics or the order of the patterns evaluated by the static analysis engine. The static analysis engine may include or cooperate with a correlation/classification engine, which may operate to reach a verdict as to whether the object is suspicious (e.g., a potential cyber-security threat) or benign based on results of the examination/detection. Suspicious objects may be provided for further analysis. In some embodiments, the correlation/classification engine may also determine whether the object is malicious, and, if so determined, may initiate an alert to a security administrator and discontinue further analysis or, in another embodiment (or pursuant to applicable analytic rules) proceed with further analysis. In some embodiments, when the correlation/classification engine classifies an object as benign, the object is subjected to no further analysis and thus "filtered" from further analysis, while in other embodiments all objects undergo the further analysis with all results of the plural analyses factored into an overall maliciousness determination, as further determined below. The operability of the static analysis engine as well as the correlation/classification engine are controlled by corresponding rule sets.

Another type of rule-based cyber-security engine operates as a dynamic analysis engine that, upon execution on the appliance, observes and examines behavior(s) of the object during run-time of a network device. A change in prioritization of the analytic rules may involve a change in the order of the monitoring and/or processing activities conducted on incoming objects being evaluated by the dynamic analysis engine. According to one embodiment of the disclosure, the dynamic analysis engine may not generally wait for results from the static analysis engine. However, in another embodiment, results of previously performed static analysis may be used to determine whether the dynamic analysis is performed. The processing activities of the object may be observed (e.g., captured) by monitors having access to a run-time environment (e.g., virtual machine) within the network device and another cyber-security engine, referred to as a correlation/classification engine, may operate to reach a verdict as to whether the object is a cyber-security threat based on results provided by the static analysis engine and the dynamic analysis engine. The operability of the static analysis engine, the dynamic analysis engine and/or monitors (all different types of cyber-security engines) are controlled by corresponding rule sets.

According to one embodiment of the disclosure, each network device, on behalf of a corresponding cyber-security engine (e.g., static analysis engine, the dynamic analysis engine, correlation/classification engine, and/or monitors) provides results of the analyses in accordance with the current analytic rules (e.g., the metadata) to the rule prioritization logic deployed within the management system. The rule prioritization logic analyzes the metadata (and metadata from any other similar cyber-security engines) and, when applicable, determines a reprioritization of the analytic rules specifying a new rule order of processing to improve performance of the cyber-security engine. This reprioritization is conveyed by one or more rule priority messages communicated to the network devices, where the priority messages may operate as an entire rule replacement of the current analytic rules provided in or specifying a new rule order of processing, or may identify changes to the current analytic rules (or their priority (order)) utilized by the corresponding cyber-security engine.

In lieu of returning the rule priority messages as a multicast transmission to all similarly situated cyber-security engines, the management system may be configured to receive metadata relating to the processing of the detection rules by a group of cyber-security engines operating on different network devices, and, after analysis of the metadata, generates and distributes a priority message (containing the proposed rule reprioritization) to each cyber-security engine of a subgroup of cyber-security engines (i.e., a subgroup being lesser in number than the group of cyber-security engines) for testing. In some embodiments, different subgroups may be assigned based on the characteristics of the customer (different types of customers may be subject to different threats). Initially, different subgroups may be assigned different rule orderings; however, the rules may be consistent across subgroups though the order in which they are processed may vary. During processing of an object by one or more rule-based cyber-security engines, data associated with the efficacy of the various rule orderings is collected and provided to the management system.

The management system assesses the data, and based on the assessment, generates a proposed optimal ordering. In some embodiments, the optimal orderings may be generated and distributed to either the same subgroup or newly generated subgroup. According to one embodiment, the cyber-security engine (e.g., software agent) would apply both the then current rule ordering and a proposed optimal ordering, and generate meta-information associated with their processing. The meta-information would be communicated to the management system and, if determined to be an improvement over the then current rule ordering, the proposed optimal ordering may replace current rule ordering. Similarly, the results may be used to generate a new proposed optimal ordering responsive to this additional information.

In particular, if the rule reprioritization is effective (e.g., achieves enhance resource-use efficiency, detection efficacy, and/or increased analysis speed in reaching a verdict), the management system sends the priority messages to the entire group of cyber-security engines (or remaining cyber-security engines of the group of cyber-security engine). Otherwise, if further adjustments in the order are needed, one or more iterations of the transmission of priority message and subsequent testing may be performed.

The rule prioritization logic of the management system can be invoked periodically or aperiodically to adjust the order of processing of the rules by one or more cyber-security engines. For example, this update process may commence in response to a timed triggering event to occur daily, or based on "time-since-last" update and/or other factors. Another factor may be "time to verdict" information, as monitored by the endpoint and included in the metadata. "Time to verdict" may be expressed in various ways, including length of time the detection needed prior to reaching a definitive verdict, or the number of rules required to be processed before reaching a definitive verdict, or other statistical methods such as average number of rules required to be applied to reach verdicts over a prescribed number of detections. The verdict may indicate whether or not the cyber-security system has detected indicators of compromise signaling a potential cyberattack or, in other words, malicious or benign activities. Alternatively, the update process may commence in response to the size of the metadata gathered by the cyber-security engine.

II. Terminology

In the following description, certain terminology is used to describe various features of the invention. For example, each of the terms "logic," "engine," "system," and "component" may be representative of hardware, firmware or software that is configured to perform one or more functions. As hardware, the term "logic" (or engine or system or component) may include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the logic (or engine or system or component) may include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component) may be stored in persistent storage.

The term "message" generally refers to signaling (wired or wireless) as either information placed in a prescribed format and transmitted in accordance with a suitable delivery protocol or information made accessible through a logical data structure such as an API. Hence, each message may be in the form of one or more packets, frames, or any other series of bits having a prescribed, structured format.

The term "object" generally relates to information having a logical structure or organization for malware analysis. The information may include an executable (e.g., an application, program, code segment, a script, dll or any file in a format that can be directly executed by a computer such as a file with an ".exe" extension, etc.), a non-executable (e.g., a file; any document such as a Portable Document Format "PDF" document; a word processing document such as Word® document; an electronic mail "email" message, web page, etc.), or simply a collection of related data (e.g., packets).

The term "computerized" generally represents that any corresponding operations are conducted by hardware in combination with software and/or firmware. The term "data store" generally refers to a data storage device such as the non-transitory storage medium described above, which provides non-persistent or persistent storage for the information (e.g., events).

According to one embodiment of the disclosure, the term "threat" may be broadly construed as any code, communication or activity that initiates or furthers a cyberattack. A threat may prompt or cause unauthorized, anomalous, unintended and/or unwanted behavior(s) or operations constituting a security compromise of information infrastructure. For instance, the threat may involve malicious software ("malware"), which is a type of malicious computer code that, as an illustrative example, executes an exploit to take advantage of a vulnerability in a network, network device or software, to gain unauthorized access, harm or co-opt operations of the network, the network device or the software, or to misappropriate, modify or delete data. Alternatively, as another illustrative example, the threat may correspond to information (e.g., executable code, script(s), data, command(s), etc.) that is designed to cause a network device to experience anomalous (unexpected or undesirable) behavior(s). The anomalous behavior(s) may include a communication-based anomaly or an execution-based anomaly, which, for example, could (1) alter the functionality of a network device executing application software in an unauthorized or malicious manner; (2) alter the functionality of the network device executing that application software without any malicious intent; and/or (3) provide unwanted functionality which may be generally acceptable in another context.

The term "network device" may be construed as either a physical electronic device featuring data processing and/or network connection functionality or a virtual electronic device being software that virtualizes certain functionality of the physical network device. The network may be a public network such as the Internet and/or a local (private) network such as an enterprise network, a wireless local area network (WLAN), a local area network (LAN), a wide area network (WAN), or the like. Examples of a network device, which may be deployed as a physical or virtual electronic device, may include, but are not limited or restricted to an endpoint such as computer system such as a workstation or server, ATM, point of sale systems, internet of things (IoT) devices, a standalone cyber-security appliance, an intermediary communication device (e.g., router, firewall, etc.), a virtual machine, or any other virtualized resource.

An "endpoint" generally refers to a physical or virtual network device equipped with a software image (e.g., operating system "OS", one or more applications), and a software agent to capture processing events (e.g. tasks or activities) in real-time for threat detection or cyber-security investigation. Embodiments of an endpoint may include, but are not limited or restricted to a laptop, a tablet, a netbook, a server, a video game console, a set-top box, a device-installed mobile software, a smartphone, wearable, or other physical or virtual devices typically utilized by a consumer.

The term "transmission medium" may be construed as a physical or logical communication path between two or more network devices or between components within a network device. For instance, as a physical communication path, wired and/or wireless interconnects in the form of electrical wiring, optical fiber, cable, bus trace, or a wireless channel using radio frequency (RF) or infrared (IR), may be used. A logical communication path may simply represent a communication path between two or more network devices or between components within a network device such as one or more Application Programming Interfaces (APIs).

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. General Architecture

A. Cyber-Security Protection Service

Referring to FIG. 1, an exemplary block diagram of an embodiment of an automated, cyber-security protection service 100 is shown. Herein, the cyber-security protection service 100 includes one or more network devices $110_1$-$110_N$ (N≥1), which are communicatively coupled to a management system 120. Each network devices $110_1$ . . . or $110_N$ includes one or more cyber-security engines $130_1$-$130_M$ (M≥1), which are configured to detect and protect the network device $110_1$ . . . or $110_N$ against the threat of a cyberattack. As shown, one type of network device (e.g., network device $110_1$ operating as a cyber-security appliance) may deploy multiple cyber-security engines $130_1$-$130_3$ that assist in threat detection and/or mitigation while another type of network device (e.g., network device $110_2$ operating as an endpoint) may deploy a single cyber-security engine $130_4$. The management system 120 may be located within the same proprietary network as the network devices $110_1$-$110_N$ (e.g., endpoints and/or appliances within an enterprise network of a customer) or may be remotely located and provided as a private or public cloud service.

As described herein, operating in accordance with an assigned set of analytic rules, each cyber-security engine $130_1$ . . . or $130_M$ is configured to assist in the analysis of incoming objects to determine whether such objects are cyber-security threats (e.g., "malicious" denoting part of a cyberattack). Given that different types of cyber-security engines perform different operations, the analytic rule sets associated with these cyber-security engines are composed of different rules and different rule combinations. For example, depending on the type of cyber-security engine, an analytic rule set may be organized to (i) control analyses of content associated with incoming objects and prioritize the analyses, (ii) prioritize selection of monitors that are responsible for gathering information associated with the behavior(s) by either the incoming object or by the software executing the object being monitored during execution, (iii) control and prioritize analyses associated with the gathered information associated with the monitored behavior(s), or (iv) control and prioritize analytics of the results from the analyses of the content associated with the objects and/or from the analyses of the gathered information associated with the monitored behavior(s). The prioritization may involve the re-ordering of the rules controlling the analyses (or monitor selection) being conducted automatically. However, in some embodiments, the ordering of the analytic rules controlling the analyses may be based on administrator input and/or received (historical) metadata. The order of the analyses (or selection) may further differ for each object type, e.g., PDF, document, executable.

As further shown in FIG. 1, each of the network devices $110_1$-$110_N$ may correspond to the same or different types of network devices. For instance, a first network device $110_1$ may correspond to a cyber-security appliance while a second network device $110_2$ may correspond to an endpoint or multiple endpoints. For the cyber-security appliance $110_1$, the threat analysis logic represents a plurality of cyber-security engines $130_1$-$130_3$ may be deployed therein. For instance, according to one embodiment of the disclosure, the plurality of cyber-security engines $130_1$-$130_3$ forming the threat analysis logic may include at least (i) a static analysis engine $130_1$, (ii) a dynamic analysis engine $130_2$, and/or (iii) a correlation/classification engine $130_3$. Each of these cyber-security engines $130_1$-$130_3$ may be under control of a different set of analytic rules (rule set), which may be evaluated and reprioritized by the management system 120.

More specifically, the first cyber-security engine $130_1$ (e.g., static analysis engine $130_1$), upon execution on the cyber-security appliance $110_1$, is configured to perform light-weight examinations of incoming objects to determine whether such objects are associated with a cyber-security threat. The examinations, conducted in according with a first rule set $140_1$, may involve statistical analysis techniques, such as heuristics or pattern correlation, to analyze the content of objects under analysis without execution of these objects.

According to one embodiment of the disclosure, a change in prioritization (ordering) of the first rule set $140_1$ may alter the ordering of operations performed by the static analysis engine $130_1$. The ordering alteration may be directed to a change in the ordering of the statistical analysis techniques (heuristics, pattern correlation, etc.) or may be directed to a change in the ordering of known malicious and/or benign patterns being evaluated with content of the objects by the static analysis engine $130_1$. According to another embodiment of the disclosure, a change in prioritization of the first rule set $140_1$ may alter weightings associated with certain rules within the first rule set $140_1$, and thus, may have a particular impact on the efficiency of identifying whether an object is malicious or non-malicious. The weighting may correspond to the severity of a rule violation as measured by the first cyber-security engine $130_1$ or another cyber-security engine, such as the correlation/classification engine $130_3$ for example, operating in concert with the first cyber-security engine $130_1$. Hence, the weighting alteration may be used to identify which of the analytic rules are salient in the analysis, where the higher weighted rules may also be performed first when the static analysis engine $130_1$ is evaluating the content within the incoming objects.

A second cyber-security engine $130_2$ (e.g., dynamic analysis engine $130_2$), upon execution on the appliance $110_1$, is configured to observe and analyze processing activities (e.g., behaviors) of incoming objects that occur during run-time and/or applications executing such objects. The analysis of these behaviors is conducted in accordance with a second rule set $140_2$, which is different from the first rule set $140_1$. Hence, the ordering in the observations and analyses of the behaviors by the dynamic analysis engine $130_2$ would be altered in response to a reprioritization of the second rule set $140_2$. In one embodiment, the dynamic analysis engine $130_2$ may not generally wait for results from the static analysis engine $130_1$ so that the dynamic analyses are performed concurrently (e.g., at least partially overlapping in time) with the static analyses. However, in another embodiment, results of a previously performed static analysis may determine whether a subsequent dynamic analysis is performed, and, in some embodiments, if performed, the rules to prioritize, e.g., which monitors to activate and captured behaviors are more probative.

Additionally, a cyber-security engine $130_3$ may be configured as a correlation/classification engine that, upon execution on the appliance $110_1$, is adapted to reach a verdict as to whether the object is a cyber-security threat. Operating in accordance with a third rule set $140_3$, the correlation/classification engine $130_3$ determines, based on results from analyses conducted by the static analysis engine $130_1$ and/or the dynamic analysis engine $130_2$, a verdict associated with an object under analysis. Therefore, a change in the third rule set $140_3$ may alter the priority (e.g., order in processing) of specific analyses being conducted by the correlation/classification engine $130_3$ on the analysis results produced by other cyber-security engines (e.g., static analysis engine $130_1$ and/or dynamic analysis engine $130_2$). By reprioritizing the analytic rules forming the third rule set $140_3$, the correlation/classification engine $130_3$ may perform analyses in accordance with selected "salient" threat detection rules of the third rule set $140_3$ (as determined by the administrator and/or metadata) earlier than previous analyses. The location for where each of these analysis engines run is provided for illustrative purposes as an example of a possible architecture. Hence, any or all of these analysis engines could run in any part of the cybersecurity-architecture.

Although not described in detail, the behaviors of the object may be observed (e.g., captured) by monitors. Therefore, a change in the ordering of the monitor activations (or the type of monitors activated) may alter the ordering in the observation and analysis of the behaviors associated with the object (or executing application) by the dynamic analysis engine $130_2$.

In the case of the endpoint $110_2$ for example, the threat analysis logic may be represented as a cyber-security engine $130_4$, namely a software agent that, upon execution on the endpoint $110_2$, is configured to reach a verdict as to whether an object under analysis is a cyber-security threat. The software agent $130_4$ analyzes the object in accordance with a fourth rule set $140_4$. Hence, as similarly described above, a change in the fourth rule set $140_4$ may alter the priority (e.g., order) of the analyses of an object conducted by the software agent $130_4$. As a result, the software agent $130_4$ performs analyses in accordance with selected "salient" rules (as determined by the administrator and/or metadata) prior to analyses conducted in accordance with non-salient rules.

Besides the detection rules described above, the post-processing rules (e.g., rules directed to reporting or issuing alerts and/or remediation rules may be prioritized). For example, reporting rules (not shown) may specify, depending on the threat landscape (e.g., prevailing at a point of time in the industry) that certain types of discovered cyberattacks should be accorded an "urgent" alert, needing immediate remediation. Such "urgent" alerts may involve transmission through a particular type of communication that tends to solicit immediate attention (e.g., text message, automated phone call, screen display generated and rendered on a security administrator's computer, etc.) or via multiple types of communications sent concurrently or at least close in time (e.g., less than 30 seconds apart). Less urgent alerts may involve placement of the alerts into a record that may be accessed by the security administrator during her or his normal course of business.

Referring still to FIG. 1, depending on the network device type, each network device $110_1$ . . . or $110_N$ may be configured to provide one or more priority control messages $150_1$-$150_N$ to rule prioritization logic 180 deployed within the management system 120. Each priority control message, such as priority control message $150_1$ for example, may be configured to provide metadata $160_1$ (e.g., historical metadata) based on one or more analysis results $170_1$-$170_4$ performed by corresponding cyber-security engines $130_1$-$130_3$ (e.g., static analysis engine $130_1$, the dynamic analysis engine $130_2$, and/or correlation/classification engine $130_3$) to the management system 120. As another example, priority control message $150_2$ may be configured to provide metadata $160_2$ (e.g., historical metadata) based on analysis results $170_5$ performed by cyber-security engine $130_5$ (e.g., software agent $130_5$) to the management system 120. Herein, the metadata $160_1$-$160_N$ may include information associated with the results from analyses of rules forming analytic rule sets that control functionality of cyber-security engine(s) operating within the network devices $110_1$-$110_N$. Examples of the metadata $160_1$-$160_N$ may include, but are not limited or restricted to (i) identifiers associated with each rule involved in a successful detection, normally a genuine detection (e.g., true positives and true negatives) to avoid promoting false positive or false negative detection such as a hash value(s) of the rules, and this portion could include multiple sources which could determine "true positive" (TP) or "true negative" (TN) and the system can arbitrate or include both as inputs to be weighed; (ii) an identifier for the object (e.g., file name, etc.), (iii) a source address of the object (e.g., Internet Protocol "IP" address), (iv) a destination address for the object, (v) a hash of the object, and/or (vi) any uniform resource locators (URLs) associated with the object.

According to one embodiment of the disclosure, the rule prioritization logic 180 analyzes the metadata $160_1$-$160_N$ and generates one or more rule priority messages $185_1$-$185_N$ responsive to priority control messages $150_1$-$150_N$. The management system 120 returns the rule priority messages $185_1$-$185_N$ to the network devices $110_1$-$110_N$. Each rule priority message $185_1$ . . . , or $185_N$ may include rule recommendations $190_1$ . . . , or $190_N$, respectively. Each rule recommendation $190_1$ . . . , or $190_N$ corresponds to information that identifies changes in prioritization of rules within one or more analytic rule set(s) that control one or more cyber-security engines deployed within a particular type of network device $110_1$ . . . , or $110_N$.

According to one embodiment of the disclosure, the rule recommendations $190_1$-$190_N$ may be generated (i) automatically (and in real-time) by the rule prioritization logic 180 based on the metadata $160_1$-$160_N$ and/or (ii) manually by an analyst or administrator relying on experiential knowledge. The generation of the rule recommendations $190_1$-$190_N$ may involve removal of, modification, or addition to the salient rules associated with the current rule set(s) implemented within the submitting network device $110_1$-$110_N$ based, at least in part, on the provided metadata $160_1$-$160_N$. However, the changes to the current rule set may be based on administrator selections provided via an administrator interface 125 within the management system 120. The rule recommendations $190_1$-$190_N$ are adjusted to reprioritize a rule set cyber-security engine.

As an illustrative example, the removal, modification or addition to a rule set (e.g., fourth rule set $140_4$) may be accomplished by issuance of the rule priority messages $185_2$. The rule priority message $185_2$ may include changes to the fourth rule set $140_4$ that may be performed by a scheduling logic or other logic within the cyber-security engine $130_2$. These changes may include changes in the ordering of rules within the fourth rule set $140_4$, changes to weightings within certain rules within the fourth rule set $140_4$ utilized by the cyber-security engine $130_2$.

One or more of the cyber-security engines $130_1$-$130_M$ (e.g., cyber-security engine $130_1$) may be deployed on-premises to detect and analyze objects propagating into or through the local network 115 to determine whether such objects are associated with a cyberattack. For instance, the cyber-security engines $130_1$-$130_3$ may operate within one or more cyber-security appliances that are installed within the local network 115 as edge network device(s), which generally operates as an endpoint within the local network 115.

Alternatively, although not shown in FIG. 1, each of the cyber-security systems $130_1$-$130_M$ may be deployed as a cloud-based solution in which the objects (or a representation thereof) are captured at the local network 115 and submitted to at least one of the cloud-based cyber-security systems $130_1$-$130_M$. Furthermore, although not shown in FIG. 1, at least one of the cyber-security systems $130_1$-$130_M$ (e.g., cyber-security system $130_4$) may be deployed at an endpoint as a software agent operating in the background to analyze and monitor for certain behaviors by the object.

B. Management System

Figure 2A:
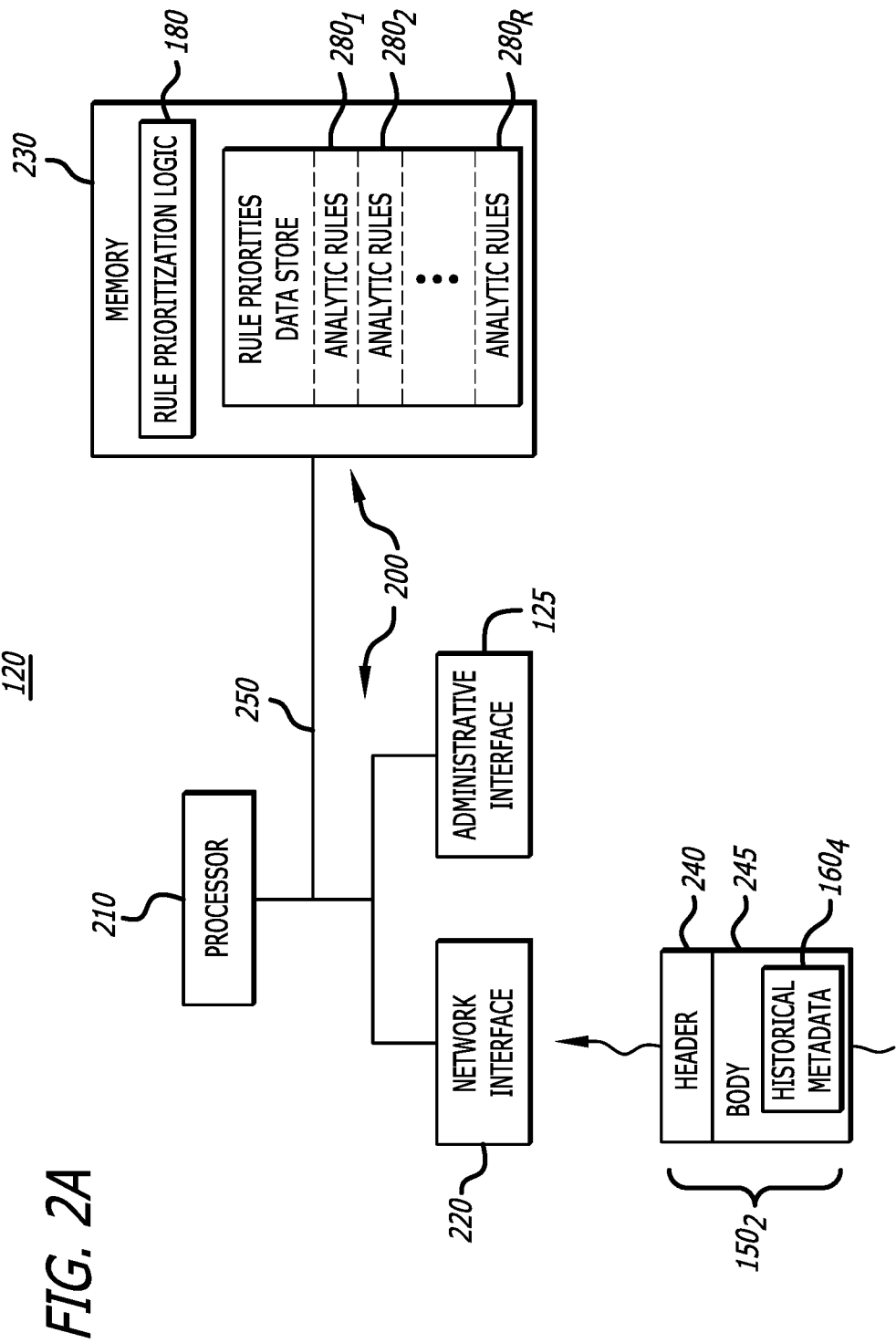
FIG. 2A is an exemplary embodiment of a logical representation of the management system deployed as part of the cyber-security protection service of FIG. 1.

Referring now to FIG. 2A, an exemplary embodiment of a logical representation of the management system 120 of FIG. 1 is shown. Herein, the management system 120 includes a plurality of components 200, including a processor 210, a network interface 220, a memory 230, and/or an administrative (I/O) interface 125, which are communicatively coupled together via a transmission medium 250. As shown, when deployed as a physical device, the components 200 may be at least partially encased in a housing (not shown) made entirely or partially of a rigid material (e.g., hardened plastic, metal, glass, composite, or any combination thereof) to protect these components 200 from environmental conditions. As a virtual device, however, the management system 120 is directed to some or all of the logic within the memory 230.

The processor 210 is a multi-purpose, programmable component that accepts digital data as input, processes the input data according to stored instructions, and provides results as output. One example of a processor may include a central processing unit (CPU) with a corresponding instruction set architecture. Alternatively, the processor 210 may include another type of CPU, a digital signal processor (DSP), an Application Specific Integrated Circuit (ASIC), a field-programmable gate array (FPGA), or the like.

As shown in FIG. 2A, the processor 210 is communicatively coupled to the memory 230 via the transmission medium 250. According to one embodiment of the disclosure, the memory 230 is adapted to store (i) rule prioritization logic 180 and (ii) rule priorities data store 260. Herein, the rule prioritization logic 180 can be invoked periodically or aperiodically to determine whether any adjustment of an analytic rule set is warranted in efforts to improve operability of any of the network devices $110_1$-$110_N$ of FIG. 1. For example, a rule update process involving the rule prioritization logic 180 may be triggered to occur daily, or based on "time-since-last" update and/or other factors. Another factor may be "time to verdict" information, as monitored by network device $110_2$ and included in part of the metadata $110_2$. "Time to verdict" may be expressed in various ways, including (i) the amount of time utilized by one or more cyber-security engines to reach a definitive verdict, (ii) the number of rules processed in reaching the definitive verdict, or (iii) other statistical methods such as average number of rules utilized over a prescribed number of detections. The verdict may indicate whether or not the cyber-security engine has detected indicators of compromise signaling a cyber-security threat or, in other words, potential malicious or benign activities.

More specifically, the rule prioritization logic 180 parses an incoming priority control message (e.g., priority control message $150_2$) received from a network device (e.g., network device $110_2$) via the network interface 220. Such parsing may extract data from a header 240 of the priority control message $150_2$ to identify a sender of the priority control message $150_2$. Where the sender is a subscriber of the cyber-security protection service 100, the software profile of the subscriber may be referenced and content from the software profile may be utilized in the reprioritization of one or more rule sets as described below and illustrated in FIG. 7. The parsing may extract data from a body 245 of the priority control message $150_2$, which may include metadata $160_4$ (based on prior threat detection analyses performed by software agent $130_2$). Based on the metadata $160_2$ in combination with analysis results received from any other endpoints including software agents, the rule prioritization logic 180 determines whether reprioritization of a rule set utilized by at least the software agent $130_4$ is needed in order to reduce the number of rules needed to be processed before a determination can be made whether the message is malicious or non-malicious, thereby increasing the efficiency of the software agent (and other software agents within the cyber-security protection service 100 of FIG. 1).

Referring now to FIG. 2B, an illustrative embodiment of the data structure of the rule priorities data store 260 is shown. Herein, the rule priorities data store 260 includes storage locations $270_1$-$270_R$ (R≥2) to collectively maintain analytic rules 280 (e.g., rules $280_1$-$280_R$) relied upon by the cyber-security engines $130_1$-$130_N$ in detected indicators of compromise associated with a suspect object signaling a potential cyber-security threat as described above. As shown, according to this embodiment of the disclosure, each of the storage locations $270_1$-$270_R$ includes analytic rules 280 along with metadata pertaining to each of these analytic rules 280 such as rule orderings (rankings) 282, rule weightings 284, frequencies of reporting 286, and identifiers (e.g., hash values) 288.

Given that different type of cyber-security engines utilize different analytic rules, the storage locations $270_1$-$270_R$ may be organized into groups of rules based on cyber-security engine type. As shown, for illustrative purposes this rule grouping includes four (4) rule groups 275-278, each representing a different type of cyber-security engine (e.g., static analysis engine $130_1$, dynamic analysis engine $130_2$, correlation/classification engine $130_3$, and software agents $130_4$). The fourth rule group 278 includes at least the fourth rule set $140_4$, as the number of rules in the fourth rule set $140_4$ being utilized by the software agent $130_1$ of the second network device $110_2$ may be less than the number of rules forming the fourth rule group 278 that are available for use by software agents. Similarly, the first-third rule groups 275-277 include at least the first-third rule sets $140_1$-$140_3$. Other groups of analytic rules implemented within the rule priorities data store 260 may include post-processing rules such as remediation rules and/or reporting/alerting rules as described above.

As shown in FIGS. 2A-2B, the rule orders 282 identify salient rules with each rule group 275-278 based on a level of importance as set by an assigned ranking. Stated differently, the assigned rankings are group-specific, and thus, a specific ranking assigned to rules pertaining to one rule group (e.g., fourth rule group 279) has no effect on any rankings assigned to rules within another rule group (e.g., any of rule groups 275-277). The rule prioritization logic 180 may alter the assigned rankings to rules within each rule group based on the metadata provided to the management system 120. For example, the rule prioritization logic 180 may alter the rankings assigned to different analytic rules with the fourth rule group 278 based on the metadata $160_4$ provided by the endpoint $110_2$ as well as other endpoints with software agents communicatively coupled to the management system 120.

The rule weightings 284 also may be used to identify salient rules with each rule group 275-279. The rule prioritization logic 180 may alter the assigned weightings to rules within each rule group 275-278 based on the metadata. Sometimes, the rule weighting $284_1$ . . . or $284_R$ has a direct correlation with the severity of a potential cyberattack in response to a rule activation (also referred to as a "rule violation"). Hence, a cyber-security engine may conclude that the suspect object is a cyber-security threat based only on a few rule violations, provided these rule violations are directed to at least one analytic rule that, upon detection, is sufficient to exceed an applicable likelihood threshold. Depending on the selected implementation, any updates by the rule prioritization logic 180 to the stored weighting metadata for one or more analytic rules (e.g., fourth rule group 278) may warrant a change in processing order of these updated rules $280_{R-9}$-$280_R$, represented as R1 $280_{R-9}$ through R10 $280_R$. These updated rules may also be reordered by the rule prioritization logic 180 or by the cyber-security engine upon receiving the updated rules with the changed weighting via rule priority messages $185_1$-$185_N$.

The frequencies of reporting 286 may be used to assist in identify salient rules within each rule group 275-278. The rule prioritization logic 180 receives the priority control messages including the metadata $160_1$-$160_4$, which includes an identifier associated with each of the rules implicated in prior detections. Responsive to the same rules being involved in the detection of potential cyber-security attacks, which may be determined by matching identifiers within the incoming metadata to identifiers $288_1$-$288_R$ stored within the rule priorities data store 260, the corresponding frequencies of reporting $286_1$-$286_R$ is updated (e.g., incremented). Responsive to the same rules being involved in the detection of potential cyber-security attacks, the rule prioritization logic 180 may determine that these rules are "salient" rules and alter the processing order of these rules accordingly.

Additionally, as an optional embodiment as shown in FIG. 2C, one or more of the rule group 275 . . . and/or 278 may be further organized into two or more rule subgroups 290 and 292. These rule subgroups 290 and 292 may enable further prioritization of the analytic rules $280_{R-9}$-$280_R$ based on one or more factors, which may pertain to characteristics of the network devices (e.g., geographic location, properties directed to hardware and/or software configurations, etc.) and/or the subscriber(s) associated with the network devices uploading priority control messages to the management system 120. Such information may be extracted from content of the uploaded priority control messages (e.g., IP source address) or from content within a software profile completed by the subscriber at registration. From this information, the rule prioritization logic 180 may be able to determine the industry, government or other subscriber category, and/or geography of the network device supplying the priority control message and create subgroups therefrom. Herein, the rule prioritization logic 180 would assign additional priorities (e.g., order and/or weighting) pertaining to that rule subgroup.

Referring back to FIG. 2A, the administrative interface 125 is a portal that allows, after credential exchange and authentication, an administrator access to the contents of rule priorities data store 260. For instance, the administrative interface 125 may provide a graphics user interface (GUI) that allows an authenticated user to override or influence the order and/or weighting assigned to the analytic rules $280_1$-$280_R$ maintained within the priorities data store 260. This provides the administrator with an ability to customize the reprioritized rule sets to ensure that certain rules, which are viewed by the administrator as important, are retained as salient rules. The rule selection by the administrator may be supported by the rule prioritization logic 180 generating a suggested listing of analytic rules, where the suggested listing may be based on predicted threat severity (high, medium, low) and/or probability of occurrence (high, medium, low), e.g., with respect to the particular subscriber, subscriber category and corresponding threat landscape. The administrator may manually alter the rule prioritization included in the suggested listing to customize the reprioritization of rules to particular cyber-security threat concerns by the administrator.

Additionally, the administrative interface 125 may enable an authenticated user to alter (e.g., modify or change) the prioritization scheme currently utilized by the rule prioritization logic 180. As a result, the administrative interface 125 enables the user to adjust what parameters are considered (and the degree of reliance on such parameters) by the rule prioritization logic 180 in reprioritizing stored analytic rules. This alteration of the rule prioritization logic 180 may allow the authenticated user to bias prioritization of the stored analytic rules within each rule group to produce "salient" rules which may be different from the salient rules produced by the rule prioritization logic 180 prior to alteration.

C. Network Device—Endpoint Deployment

Figure 3:
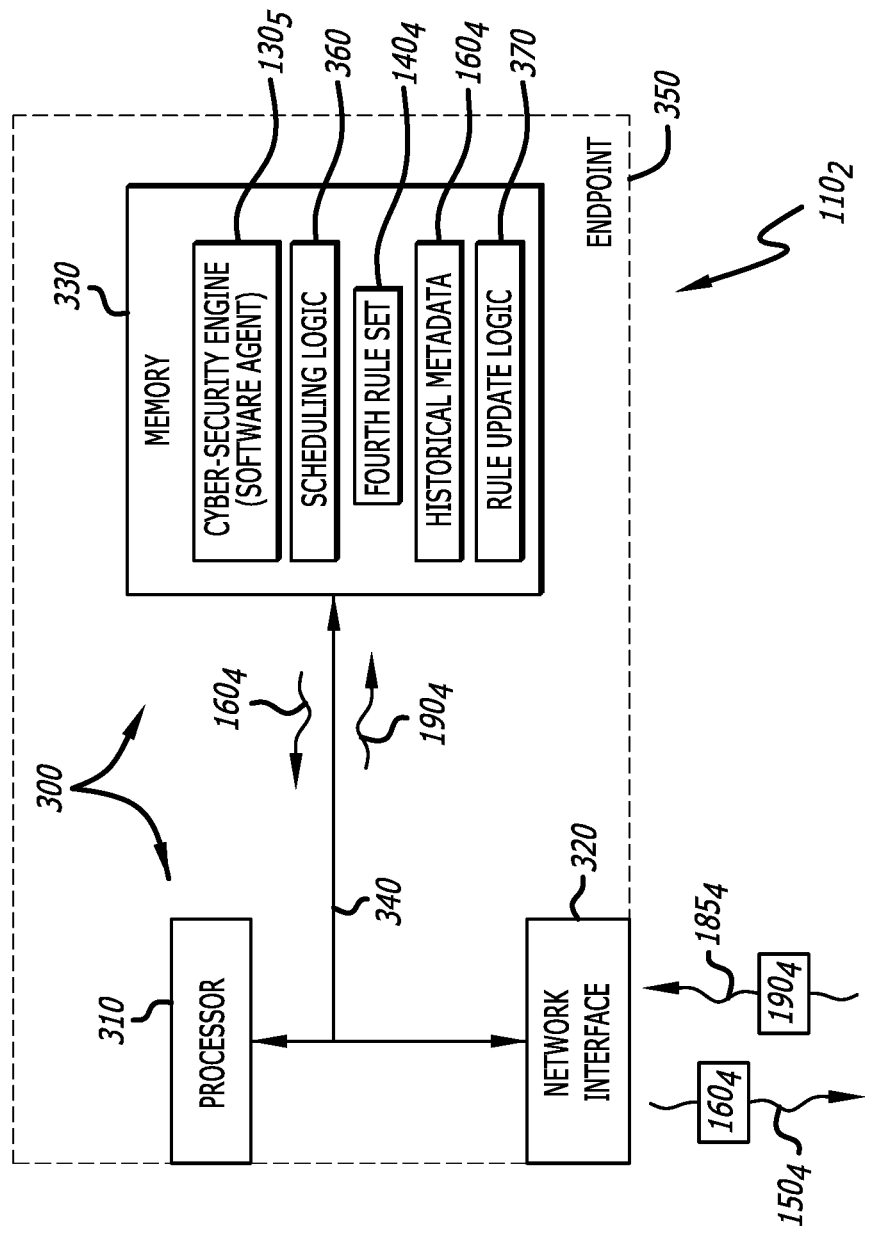
FIG. 3 is an exemplary embodiment of a logical representation of a network device implemented as an endpoint including a cyber-security engine operating as a software agent that performs cyber-security operations on incoming objects and communicates the results of such operations to the management system of FIG. 1.

Referring to FIG. 3, an exemplary embodiment of a logical representation of a network device (e.g., network device $110_2$) of FIG. 1 is shown. Herein, for this embodiment, the network device $110_2$ operates as an endpoint, including a plurality of components 300, including a processor 310, a network interface 320 and a memory 330, which are communicatively coupled together via a transmission medium 340. As shown, when deployed as a physical device, the components 300 may be at least partially encased in a housing 350. As a virtual device, however, the network device $110_2$ is directed to some or all of the logic within the memory 330.

Herein, the processor 310 is a multi-purpose, programmable component such as a CPU, DSP or other programmable component as described above in reference to the processor 210 shown in FIG. 2A. The memory 330 may be implemented as persistent storage, including the cyber-security engine $130_4$ that, upon execution on the processor 310, operates as a daemon software agent by conducting a run-time analysis of received objects for any benign or malicious behaviors. The malicious behaviors may be based on detection of one or more indicators of compromise (IOCs), namely unauthorized, anomalous, unintended and/or unwanted behavior that may signal a potential cyberattack. The operability of the software agent $130_4$ is controlled by a plurality of analytic rules corresponding to the fourth rule set $140_4$ stored in the memory 330.

The memory 330 further includes scheduling logic 360 that, upon execution by the processor 310, specifies the order of processing of the plurality of analytic rules forming the fourth rule set $140_4$. According to one embodiment of the disclosure, at initial start-up, the scheduling logic 360 sets the processing order of the plurality of analytic rules to a default order. The default order may be a factory setting that represents a preferred order of analysis as to compliance with the plurality of analytic rules of the fourth rule set $140_4$.

While processing objects and evaluating the behaviors of the objects in accordance with the default-ordered, analytic rules, the software agent $130_4$ may collect historical metadata associated with the processing of the rules (e.g., object identifiers, verdicts computed for the objects, false negative and false negative count, resource usage, identifiers for each rule involved in a successful detection of an object, source address of the object, etc.). The historical metadata is locally stored as part of the metadata $160_4$.

Responsive to a triggering event, which may be based on periodic or aperiodic (ad hoc or on demand) messaging from the management system (not shown) or an occurrence of an event by the network device $110_4$ (e.g., metadata $160_2$ exceeds a prescribed size), rule update logic 370 within the network device $110_2$ generates and transmits one or more priority control messages $150_4$, including the metadata $160_2$, to the management system 120 via the network interface 320. In response to the priority control message(s) $150_4$, depending on the content of the metadata $160_2$, the network device $110_2$ may receive one or more priority messages $185_4$, which may include the rule recommendations $190_4$. The rule update logic 370 extracts the rule recommendations $190_4$ and modifies the stored default ordering information to reprioritize (e.g., reorder and/or re-weight) the processing order of the analytic rules forming the fourth rule set $140_4$. Additionally, or in the alternative, the rule recommendations $190_4$ may cause one or more analytic rules may be added or removed from the fourth rule set $140_4$. Thereafter, the scheduling logic 360 signals the cyber-security engine $130_4$ to perform analyses of incoming objects for benign or malicious behaviors in accordance with the reprioritized processing order of analytic rules of the fourth rule set $140_4$.

D. Network Device—Appliance Deployment

Figure 4:
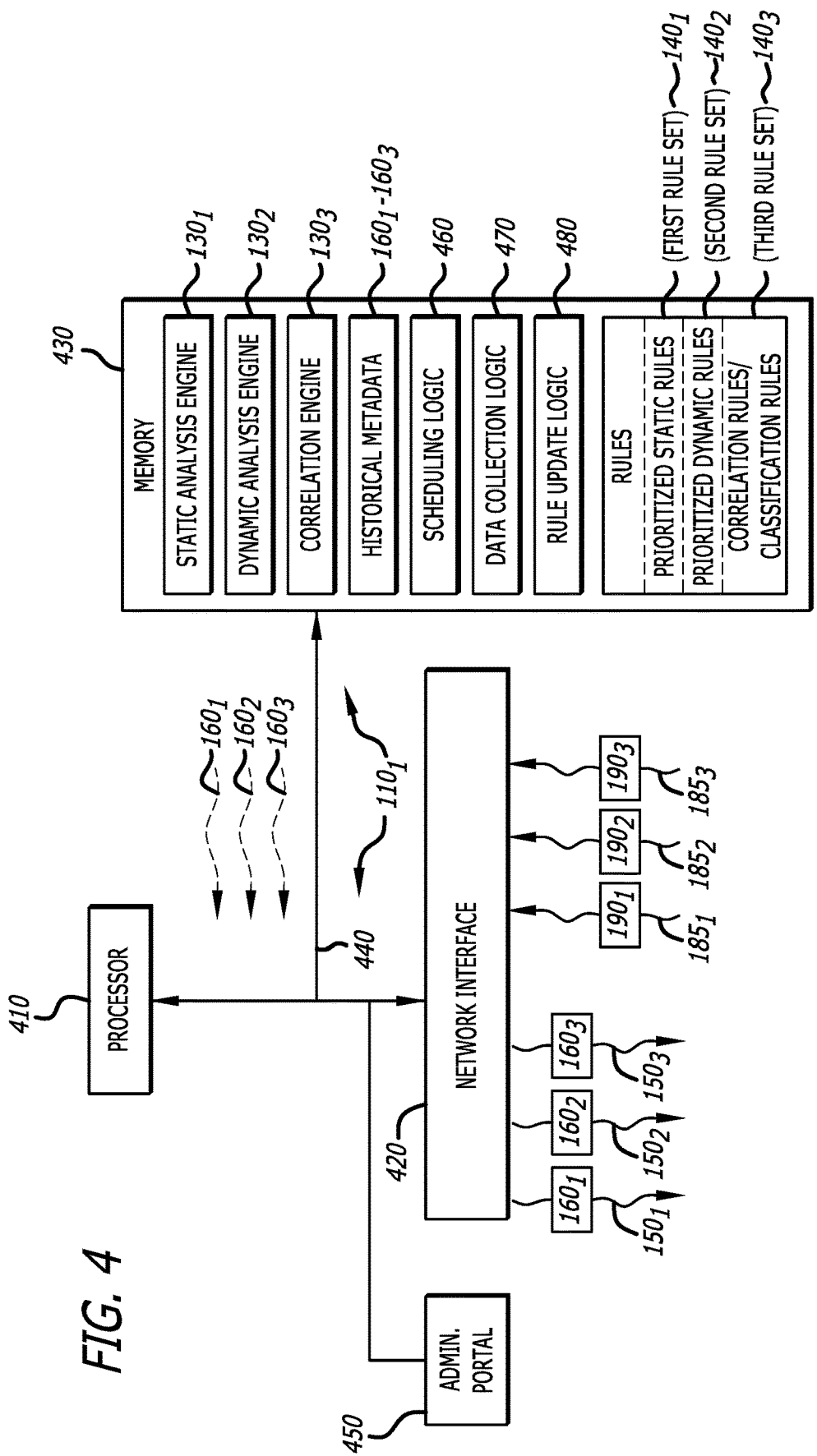
FIG. 4 is an exemplary embodiment of a logical representation of a network device implemented as a cyber-security appliance including multiple cyber-security engines that perform cyber-security operations on incoming objects and communicate the results of such operations to the management system of FIG. 1.

Referring to FIG. 4, an exemplary embodiment of a logical representation of a cyber-security appliance (e.g., network device $110_1$) of FIG. 1 is shown. Herein, deployed as a physical device or as a virtual device, the network device $110_1$ may be configured to operate as a cyber-security appliance, including a plurality of components 400, including a processor 410, a network interface 420 and a memory 430, which are communicatively coupled together via a transmission medium 440. Additionally, the plurality of components 400 further comprises an administrative portal 450 that enables authorized access to contents of the memory 430. The administrative port 450 permits different types of rules to be altered (e.g., modified, deleted, or added).

As described above, the processor 410 is a multi-purpose, programmable component such as a CPU, DSP or other programmable component as described above in reference to the processor 310 shown in FIG. 3. The memory 430 may include multiple cyber-security engine $130_1$-$130_3$, where the operability of the cyber-security engine $130_1$-$130_3$ is controlled by programmable rule sets and the cyber-security engine $130_1$-$130_3$ collectively operate to detect a potential cyberattack. Example of the cyber-security engine $130_1$-$130_3$ may include static analysis engine, dynamic analysis engine, correlation/classification logic, and monitors.

The static analysis engine $130_1$, upon execution by the processor 410, is configured to perform a light-weight examination of an object to determine whether that object is suspicious and/or malicious. The static analysis engine $130_1$ may employ analysis techniques, such as heuristics or pattern matching for example, in order to detect unrecognizable or known, malicious characteristics without execution of the object. Herein, the first rule set $140_1$ is stored within the memory 430 and the operations of the static analysis engine $130_1$ are governed, at least in part, by the first rule set $140_1$. As the first rule set $140_1$ is programmable, the static analysis engine $130_1$ may operate differently as prioritization of the analytic rules within the first rule set $140_1$ are changed.

The dynamic analysis engine $130_2$, upon execution by the processor 410, is configured to observe behavior(s) of the object during run-time. The observed behaviors are compared to known malicious behaviors and/or known benign behaviors in efforts to detect whether the object under analysis is associated with a potential cyberattack. According to one embodiment of the disclosure, operability of the dynamic analysis engine $130_2$ may be altered by changing prioritization of the analytic rules of the second rule set $140_2$ that control such operability. Such changes may be accomplished by at least reordering certain analytic rules of the second rule set $140_2$ when certain processing activities performed during object run-time are evaluated by the dynamic analysis engine $130_2$. Additionally, operability of the dynamic analysis engine $130_2$ may be altered by changing what behaviors are being monitored. Alternatively, the behavioral changes may also be accomplished by reprioritizing analytic rules that select what processing activities are being monitored (and the monitoring order). The change in monitoring may alter operability of the dynamic analysis engine $130_2$ and this would alter future processing of rules and analysis/evaluation, or also could be used to re-evaluate past actions under the newly changed dynamic analysis engine 130

The correlation/classification engine $130_3$, upon execution by the processor 410 and operating in accordance with the third rule set $140_3$ stored in the memory 430, is configured to reach a verdict, based on the results from the static analysis engine and/or the dynamic analysis engine, as to whether the object under analysis is part of a potential cyberattack. The reprioritization of one or more analytic rules of the third rule set $140_3$ may alter when certain analyses, corresponding to the reprioritized analytic rules, are conducted by the correlation/classification engine $130_3$. More specifically, the altering the priority of one or more analytic rules of the third rule set $140_3$ may change which analytic rules of the third rule set $140_3$ are considered to be the "salient" rules. This may affect the verdict determined by the correlation/classification engine $130_3$ as the reprioritization may redirect focus on the analyses by the correlation/classification engine $130_3$ on results associated with a different subset of analytic rules of the third rule set $140_3$ than previously considered.

According this embodiment of the disclosure, the correlation/classification engine $130_3$ may operate in concert to reach the verdict, and thus, the correlation rules and the classification rules may be prioritized together as the third rule set $140_3$. Alternatively, given that the correlation engine may deploy a rule set separate from the rule set utilized by the classification engine, and thus, the rule set utilized by the correlation engine may be prioritized separately from the rule set utilized by the classification engine.

The memory 430 further includes scheduling logic 460 that, upon execution by the processor 410, specifies the order of processing for each rule set $140_1$-$140_3$ controlling operations of different cyber-security engines $130_1$-$130_3$. According to one embodiment of the disclosure, at start-up, the scheduling logic 460 sets the processing order of each rule set $140_1$-$140_3$ to an initial order. At this time, each rule set $140_1$-$140_3$ may carry a default priority or in some embodiments, where no priority is defined, may be assigned a rule processing priority (e.g., randomly assigned, based on time of receipt, etc.). While receiving objects, followed by analysis of the content and their behaviors, data collection logic 470 may gather metadata associated with the processing of the rule $140_1$-$140_3$ by the cyber-security engines $130_1$-$130_3$, respectively. The metadata may include, but is not limited or restricted to object identifiers, verdicts computed for the objects, false negative and false negative count, resource usage, identifiers for each rule involved in a successful detection of an object, source address of the object, or the like. The metadata is locally stored as part of the metadata $160_1$.

Responsive to a triggering event, which may be based on periodic or aperiodic messaging from the management system (not shown) or an occurrence of an event by the network device $110_1$ (e.g., metadata $160_1$ exceeds a prescribed size), rule update logic 480 within the network device $110_2$ generates and transmits one or more priority control messages $150_1$ . . . , and/or $150_3$, including respective metadata $160_1$, $160_2$ and/or $160_3$, to the management system 120 via the network interface 420. In response to the priority control message(s) $150_1$, $150_2$ and/or $150_3$, depending on the content of the metadata $160_1$, $160_2$ and/or $160_3$, the network device $110_2$ may receive one or more priority messages $185_1$, $185_2$ and/or $185_3$, which may include the rule recommendations $190_1$, $190_2$ and/or $190_3$.

The rule update logic 480 extracts the rule recommendations $190_1$, $190_2$ and/or $190_3$ and modifies the stored default ordering information to reprioritize (e.g., reorder and/or re-weight) the processing order of the analytic rules forming the corresponding rule set(s) $140_1$, $140_2$ and/or $140_3$. Additionally, or in the alternative, the rule recommendations $190_1$, $190_2$ and/or $190_3$ may cause one or more analytic rules may be added or removed from the corresponding rule set(s) $140_1$, $140_2$ and/or $140_3$. Thereafter, the scheduling logic 460 signals some or all of the cyber-security engines $130_1$-$130_3$ to perform analyses of incoming objects for benign or malicious behaviors in accordance with the reprioritized processing order of analytic rules of the corresponding rule set(s) $140_1$, $140_2$ and/or $140_3$. An illustrative example, similar to the unique binary analysis mentioned above, a new rule could be inserted above other rules if a unique binary analysis determines further processing or enhancement of evaluation should be performed (e.g., by a third party web service or data aggregation source for evaluation or a proprietary sandbox technology) and any of the enhanced evaluations should convict the artifact in question as "known high priority or damaging threat" then this could immediately increase the weighting of the analysis of the artifact, and subsequent unique binaries matching similarity analysis (or other criteria) could similarly be flagged as higher priority in the existing rules.

E. Network Device—Sensor Deployment

Figure 5:
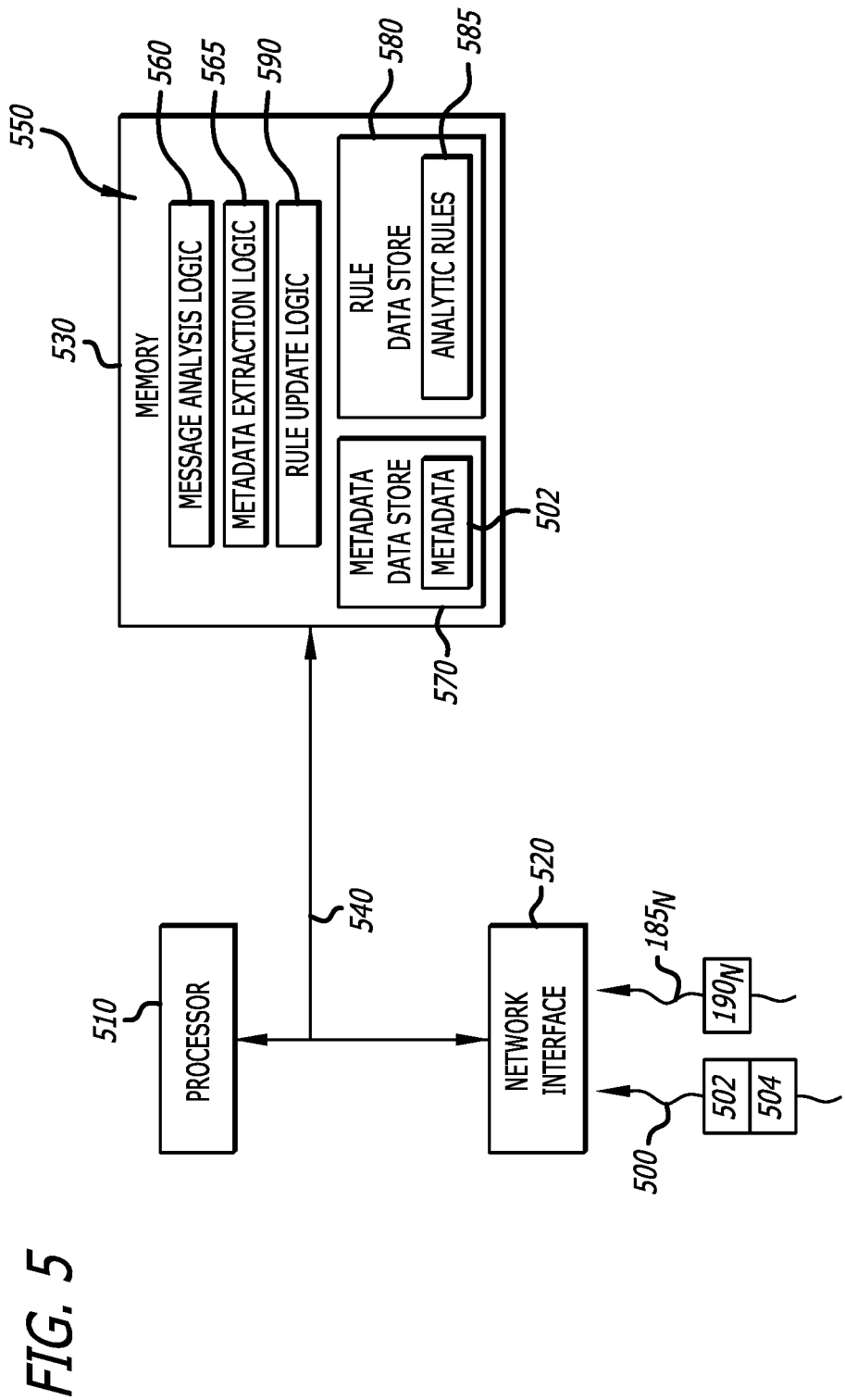
FIG. 5 is an exemplary embodiment of a logical representation of a network device implemented as a sensor including at least one cyber-security engine that performs cyber-security operations on incoming objects and communicates the results of such operations to the management system of FIG. 1.

Referring to FIG. 5, an exemplary embodiment of a logical representation of a sensor (e.g., network device $110_N$) of FIG. 1 is shown. One embodiment of the architecture of the sensor is described in U.S. patent application Ser. No. 15/283,108 filed Sep. 30, 2016, the contents of which are incorporated by reference herein. Similar to the architecture of the endpoint $110_2$ and appliance $110_1$, the sensor $110_N$ may deployed as a physical device or as a virtual device, including a processor 510, a network interface 520 and a memory 530, which are communicatively coupled together via a transmission medium 540.

Herein, the sensor $110_N$ is responsible for evaluating information routed over a network and subsequently providing a data submission, which includes at least a portion of the evaluated information, to a cluster (not shown) for conducting an in-depth malware analysis. A "cluster" is a scalable, threat detection system that includes one or more computing node that analyze suspicious objects received from the sensors. Stated differently, the sensor $110_N$ conducts a preliminary analysis of a received object, which is copied or intercepted during transit over the network, in order to intelligently control the number and/or frequency of data submissions to the cluster for analysis. In some embodiments, the number or frequency of submission of objects for analysis or the number and frequency of analyses may be based on the subscription privileges of the subscriber.

The processor 510 is a multi-purpose, processing component that is configured to execute logic 550 maintained within the persistent storage 530 being non-transitory storage medium. As described below, the logic 550 may include, but is not limited or restricted to, (i) message analysis logic 560, (ii) metadata extraction logic 565, (iii) metadata data store 570, (iii) rule data store 580 including analytic rules 585 that control operability of at least the message analysis logic 560, and (v) rule update logic 590.

As shown, the network interface 520 is configured to receive an incoming message 500, including metadata 502 and the object 504, from a network or via a network tap. The metadata analysis logic 560, executed by the processor 510 and under control by analytic rules 585, may conduct an analysis of at least a portion of the message 500, such as the object 504 for example, to determine whether the object 504 is suspicious. If so, the processor 510 processes the metadata extraction logic 565 that, during such processing, extracts the metadata 502 from the received information 500 and assigns the object identifier for the metadata 502. The metadata 502 may be stored in a metadata data store 570 while the suspicious object 504 may be stored in the same or a separate data store. The metadata 502 may be provided to a queue, accessible by computing nodes within the cluster, to obtain the metadata 502 and recover the object 504 to render a verdict as to whether the object 504 is a potential cyber-security threat. The verdict may be rendered through a variety of threat detection scheme, including threat detection processing as performed by the static analysis engine $130_1$, dynamic analysis engine $130_2$ and/or correlation/classification engine $130_3$ as described above.

Herein, the metadata analysis logic 560 conducts analyses, in accordance with the analytic rules 585, to determine whether the object 504 is suspicious. The metadata analysis logic 560 may employ analysis techniques, such as heuristics or pattern matching for example, in order to analyze the content of the object 504 after execution, during execution, prior to execution while the process is blocked by the system, post-execution, or while the object is at rest, without being executed. Herein, the analytic rules 585, stored within the memory 530, may be reprioritized in response to the rule update logic 590 receiving rule recommendations $190_N$ included as part of the rule priority messages $185_N$ from the management system 120 of FIG. 1. Based on the reprioritization of the analytic rules 585, the metadata analysis logic 560 may operate differently as described above.

IV. Registration

Figure 6A:
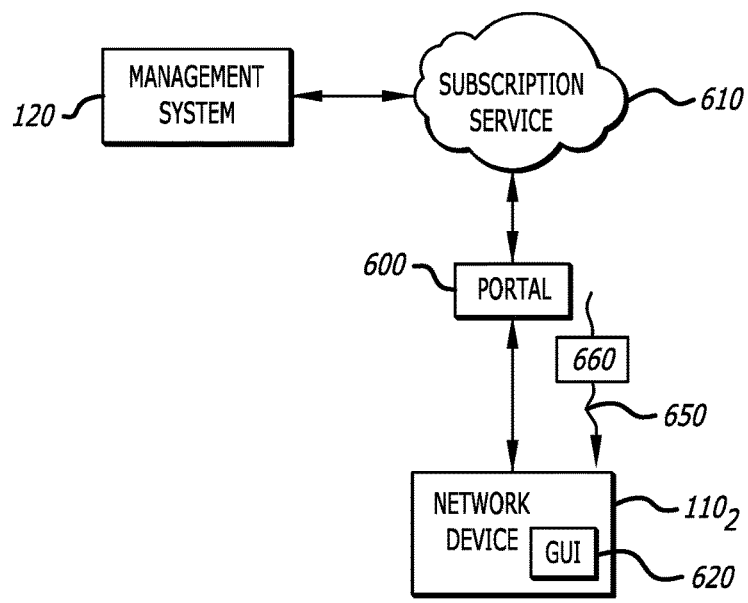
FIG. 6A is an illustrative embodiment of a registration process for a customer to subscribe to the cyber-security protection service of FIG. 1.

Referring now to FIG. 6A, using a portal 600 providing access to a subscription service 610 communicatively coupled to the management system 120, a customer is able to register (subscribe) to services offered by the management system 120. Additionally, via the portal 600, a customer (now "subscriber") may be further able to modify current terms of the subscription selected by the customer (e.g., change subscription level, increase/decrease number of authorized network devices registered with the management system 120, change customer-configured attributes, etc.). By registering and selecting a particular subscription offered by the subscription service 610, the management system 120 maintains a certain metadata pertaining to the subscriber and/or network devices registered by the subscriber that are participating in the cyber-security protection service 100.

Figure 6B:
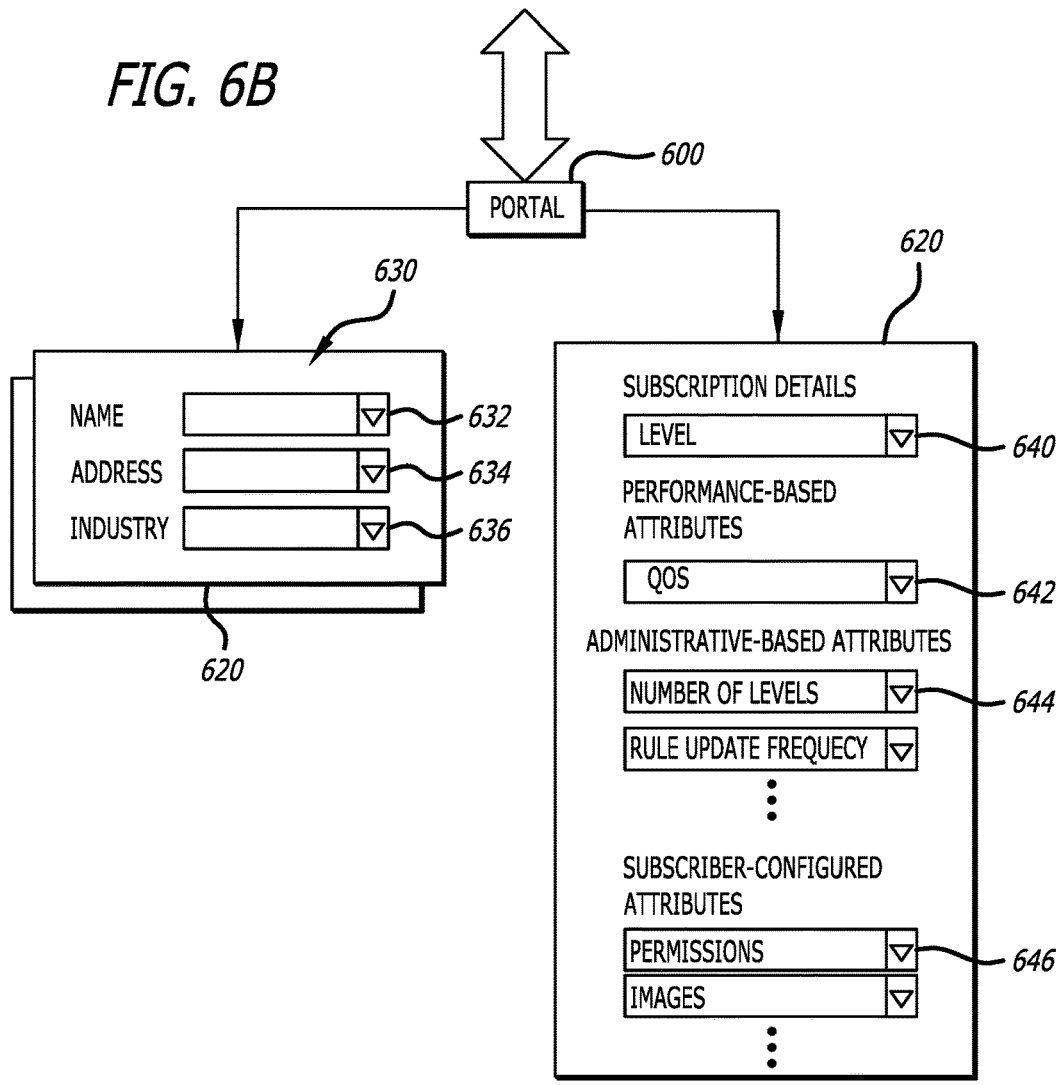
FIG. 6B is an illustrative embodiment of a portal-based interface provided to a customer for web-based registration to the cyber-security protection service of FIG. 1 and formation of a software profile for this new subscriber.

As an illustrative example, as shown in FIG. 6B, the portal 600 may provide a customer with access to one or more webpages 620, which allows a customer to supply customer details 630 (e.g., customer name 632, geographic location(s) 634 for the customer as represented by address or other information, customer's industry 636 that may be represented by a pull-down menu with a listing of high-level industry categories (financial, technology, United States government, etc.) and/or lower level industry subcategories (e.g., banking, brokerage, semiconductor manufacturer, government agency, network infrastructure manufacturer, etc.). The webpages 620 may prompt the customer for such customer details 630 and other information using conventional "user interactive" techniques. These may include a web form, e.g., rendered by a conventional web browser of the customer, including one or more online pages that prompts for and accepts customer input.

The portal 600 may further enable the customer to select a subscription level 640, which may automatically assign certain subscription attributes for the customer's subscription. These subscription attributes may include certain performance-based attributes 642 (e.g., QoS thresholds, throughput thresholds, etc.) and/or administrative-based attributes 644 (e.g., rule update frequency, total number of network device supported, selected rule update scheme being either automated rule updating that requires no administrative confirmation or semi-automated rule updating that requires administrative confirmation before proceeding with the rule update). Also, the portal 600 allows the subscriber to customize the subscription through subscriber-configured attributes 646 (e.g., data analytic geographic permissions or restrictions, special guest image software profiles for use in virtualized processing of objects by cyber-security engines of the network devices, alert rule reprioritization confirmations, etc.).

Referring back to FIG. 6A, upon completing registration (or modification of the subscription) via the portal 600, a message 650 may be provided to a network device (e.g., endpoint, web server, etc.) that is used in the registration process or selected by the customer during the registration process. The message 650 includes at least access credentials 660 that, if installed into a network device utilized by the subscriber (e.g., network device $110_2$), enables the network device $110_2$ to communicate with the subscription service 610 for update the subscription parameters and gain access to one or more user interfaces 670 (e.g., web page(s), graphical user interface(s) "GUI(s)," etc.) that allow an authorized administrator for the sub scriber to select rule prioritization procedures for that subscriber.

Figure 6C:
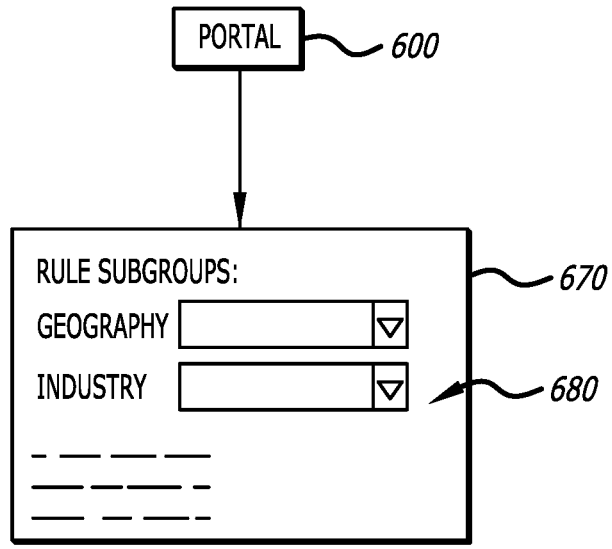
FIG. 6C is an illustrative embodiment of an interactive interface provided to the new subscriber to allow for membership of the subscriber to one or more rule subgroups for further granularity in subsequent reprioritization of analytic rules.

More specifically, as shown in FIG. 6C, responsive to successful access credential authentication, the portal 600 may provide a customer with access to the user interface(s) 670, which allows the subscriber to select one or more rule subgroups 680 to which the subscriber desires membership. The subgroups 680 may be arranged in accordance with any number of factors, including geographic location of the subscriber, subscriber's industry, or the like. Upon selecting one or more of these subgroups, a resultant rule reprioritization generated by the management system 120, in response to one or more rule priority messages received from network device utilized by the subscriber, may differ from rule reprioritizations without designation of the rule subgroup or designation of different rule subgroup(s).

Figure 6D:
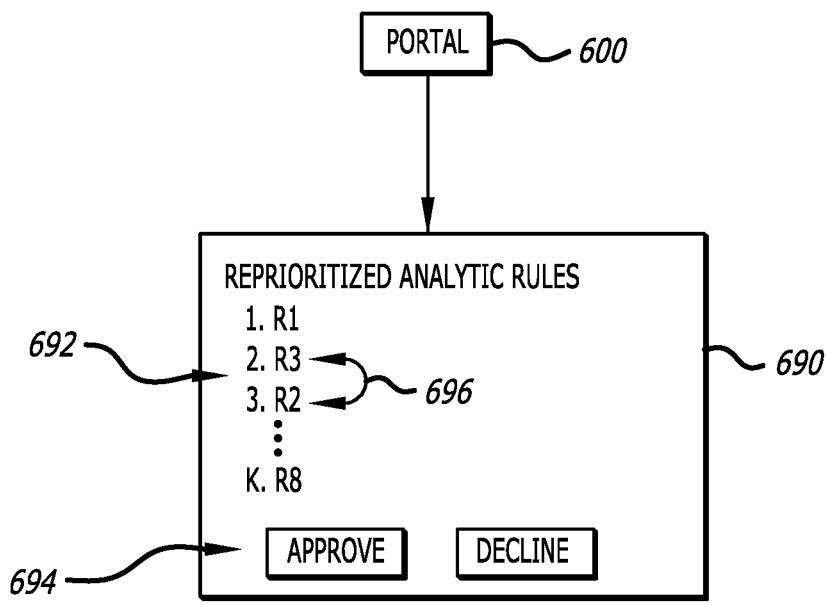
FIG. 6D is an illustrative embodiment of an interactive interface provided to the new subscriber to allow for semi-automated rule updating that requires administrative confirmation before proceeding with the rule update.

Referring now to FIG. 6D, where the subscriber has registered for semi-automated rule updating that requires administrative confirmation before proceeding with the rule update, an alert rule reprioritization confirmation 690 is provided to the network administrator via the portal 600 or through separate band (e.g., text, email, automated phone call, etc.). The alert rule reprioritization confirmation 690 includes a displayable sequence of analytic rules 692 arranged in accordance with a recommended priority scheme (e.g., order, weighting, etc.) and a displayable acknowledgement radio button 694 that, when selected, constitutes administrator approval of the analytic rules 692. Prior to selection of the acknowledgement radio button 694, the analytic rules 692 may be reprioritized by the administrator by repositioning display elements 696 representative of the reprioritized analytic rules rendered on the user interface(s), tagging or re-ranking certain analytic rules that are deemed important to the administrator, or otherwise selecting a different ordering and/or weighting for the reprioritized rules.

Referring to FIG. 7, an illustrative embodiment of the operational flow of the management system 120 in reprioritizing rules controlling operations of a particular cyber-security engine (e.g., software agent) deployed within each of a plurality of network devices (e.g., endpoints $700_1$-$700_S$, where S≥2) is shown. Initially, a first rule set 710 (R1, R2, R3, R4, R5, R6, R7, R8, R9, R10) is uploaded to the endpoints $700_1$-$700_S$ and made available to the software agents $720_1$-$720_S$ operating within the endpoints $700_1$-$700_S$ (operation 1). The management system 120 and each of the endpoints $700_1$-$700_S$ maintain a transmission protocol to communicate with each other concerning the current rule execution state of the corresponding endpoint $700_1$, . . . , or $700_S$.

More specifically, responsive to a periodic or aperiodic triggering event as described above, each of the endpoints $700_1$-$700_S$ may transmit corresponding priority messages $730_1$-$730_S$ therefrom (operation 2). Each priority message $730_1$, . . . , or $730_S$ may include metadata $160_1$-$160_S$, which collectively identify potentially "salient" rules 740 (e.g., rules R3, R5, R7 identified in priority message $730_1$) in prior threat detection analytics. These rules 740 (R3, R5, R7) may assist in identifying salient rules for future analyses by the software agents $720_1$-$720_S$ reprioritization of the first rule set

710. In fact, by reprioritizing the first rule set 710 where rules R3, R5, R7 are processed earlier (near start of rule set) than the remaining portion of the rule set (R1, R2, R4, R6, R8, R9, R10), a determination is made whether the reprioritized rule set 750 (R3, R5, R7, R1, R2, R4, R6, R8, R9, R10) reduces the amount of time or processing needed to achieve an outcome. For instance, where the cyber-security engine is directed to the correlation/classification engine or a dynamic analysis engine, the determination may conclude that the amount of analysis (e.g., number of rules processed) or processing time needed before a definitive verdict (non-malicious or malicious being part a potential cyberattack) for an object has been reduced (operation 3).

As further shown in FIG. 7, the reprioritized rule set 750 may be provided to each software agent of a subset of the software agents $720_1$-$720_S$ (e.g., software agents $720_1$-$720_2$) to test the effectiveness of the new, reprioritized rule set 750 (operation 4). The software agents $720_1$-$720_2$ apply the reprioritized rule set 750 and monitor the effectiveness of these rules (e.g., # of rules to reach verdict or determination, average processing time before malicious or non-malicious determined, etc.). If the effectiveness of the reprioritized rule 750 is validated, the reprioritized rule set 750 may be downloaded to all of the agents software agents $720_1$-$720_S$ or the remainder of the software agents $720_3$-$720_S$ (operation 5). This reprioritization scheme is an iterative operation, as the process continues to learn from infected endpoint and/or endpoints that have successfully thwarted cyberattacks, where regardless of state (infected, non-infected), the endpoints are configured to maintain knowledge of the salient analytic rules that defended against or would have protected against infection.

In another variation of the above recursive process, it is contemplated that an "in field beta" feature may aid in developing improve rule orders. As described above, the reprioritized rule set is generated by the management system 120 in response to the received metadata (i.e., meta-information) and provided to the subset of cyber-security engines (e.g., software agents $720_1$-$720_2$) to be utilized in parallel to the first rule set 710 loaded for the software agents $720_1$-$720_2$. The software agents $720_1$-$720_2$ may (i) apply both the current rule ordering set forth in the first rule set 710 and the proposed rule ordering set forth in the reprioritized rule set 750 and (ii) generate meta-information associated with their processing. The meta-information would be communicated to the management system 120 and, if the reprioritized rule set 750 offers improvements over the first rule set 710, the endpoints $700_1$-'$700_S$ may be provisioned to load the reprioritized rule set 750 for control operability of the software agents $720_1$-$720_S$. Similarly, the results may be used to generate a new proposed optimal ordering responsive to this additional information Herein, different "user groups" within an enterprise or across a number of customers may be assigned different rule sets based on characteristics of the users (e.g., industry, geographical location, etc.), as different types of users may be subjected to different threats. While the different user groups may be assigned different rule orderings, the rule composition may be consistent across user groups even though the processing order may vary. During processing of an object by one or more rule-based cyber-security engines, data associated with the efficacy and/or efficiency of the various rule orderings is collected (e.g., historical metadata) and provided to the management system. The management system 120 assesses the data, and based on the assessment, generates a proposed optimal ordering. In some embodiments, a plurality of proposed optimal orderings may be generated and distributed to either the same user groups or newly generated user groups. This process may repeat until the cyber-security system determines that an optimal efficacy and efficiency has been reached, or in the alternative, may continue with the addition of new rules.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computerized method for generating an improved cyber-security rule ordering for cyber-security threat detection or post-processing activities conducted by a rules-based cyber-security engine deployed within a network device, the method comprising: receiving metadata associated with analytics conducted on received data by the network device, the analytics being conducted in accordance with a first rule set being a plurality of rules arranged in a first ordered rule sequence and the first rule set to control operability of the cyber-security engine involved in (i) detecting whether the received data is a potential cyber-security threat or (ii) performing post-processing activities; analyzing the metadata to determine one or more salient rules from the plurality of rules; based on an analysis of the metadata, reprioritizing the plurality of rules within the first rule set by at least rearranging a processing order of the plurality of rules into a second ordered rule sequence differing from the first ordered rule sequence to produce a second rule set, the second rule set including the one or more salient rules being positioned toward a start of the second ordered rule sequence; and providing information associated with the second rule set for use by the cyber-security engine of the network device to perform analyses of incoming data received by the network device in accordance with the second rule set to achieve increased efficiency of the cyber-security engine in (i) detecting whether the received data constitutes the potential cyber-security threat or (ii) performing the post-processing activities.

2. The computerized method of claim 1, wherein the post-processing activities include (i) reporting results produced by the rule-based cyber-security engines or (ii) performing remediation activities.

3. The computerized method of claim 1, wherein the performing of the analyses of the incoming data in accordance with the second ordered rule sequence increases efficiency of the one or more cyber-security engines by reducing an amount of resources needed by the cyber-security engine to determine whether the incoming data is malicious or non-malicious from an amount of resources needed in determining whether the incoming data is malicious or non-malicious in accordance with the first ordered rule sequence.

4. The computerized method of claim 3, wherein the second ordered rule sequence includes each of the plurality of rules included in the first ordered rule sequence.

5. The computerized method of claim 1, wherein the receiving of the historical metadata further comprising receiving metadata associated with analytics conducted on data according to the plurality of rules by a second electronic device different than a first electronic device that provided the historical metadata and the reprioritizing of the plurality of rules is based, at least in part, on the historical metadata received from the first electronic device and the metadata received from the second electronic device.

6. The computerized method of claim 1, wherein the second ordered rule sequence is different than the first ordered rule sequence in which the one or more salient rules are positioned differently in the second ordered rule sequence than the one or more salient rules are positioned within the first ordered rule sequence.

7. The computerized method of claim 1, wherein the providing information associated with the second rule set for use by the cyber-security engine further comprising returning, to the cyber-security engine, the second rule set to control analyses by the cyber-security engine on the incoming data in detecting whether the incoming data is malicious or non-malicious while achieving at least improved efficiency in the analyses of the incoming data over analyses of the incoming data by the cyber-security engine as controlled by the first rule set.

8. The computerized method of claim 1, wherein the reprioritizing of the plurality of rules including the rearranging of the processing order of the plurality of rules to generate the second ordered rule sequence is automatically generated based on the historical metadata.

9. The computerized method of claim 8, wherein the reprioritizing of the plurality of rules including the rearranging of the processing order of the plurality of rules according to the second ordered rule sequence is conducted by prioritization logic automatically generating a reordering of one or more rules of the plurality of rules to produce the second ordered rule sequence.

10. The computerized method of claim 1, wherein the cyber-security engine is a software agent deployed within a network device and the plurality of rules control operability of the software agent in analyses of the incoming data to determine whether the incoming data is a cyber-security threat.

11. The computerized method of claim 10, wherein the providing of the information associated with the second rule set comprises returning the second rule set to a first plurality of software agents including the rules-based cyber-security engine to collect meta-information associated with analyses by the first plurality of software agents on the incoming data to determine improved efficacy or efficiency in the analyses of the incoming data by the cyber-security engine using the second rule set instead of the first rule set.

12. The computerized method of claim 11, further comprising: providing information associated with the second rule set a second plurality of software agents upon confirmation, based on the meta-information, that the first plurality of software agents are experiencing improved efficacy or efficiency in the analyses of the incoming data, the first plurality of software agents being a subset of the second plurality of software agents.

13. The computerized method of claim 1, wherein prior to receiving the historical metadata associated with analytics conducted on the received data by the network device, the method further comprises subscribing to a cyber-security protection service that gathers historical metadata based on cyber-security threat detection analytics performed by the rules-based cyber-security engine deployed within at least the network device.

14. The computerized method of claim 1, wherein the analyzing of the metadata is conducted after execution, during execution, prior to execution while the process is blocked by the system, post-execution, or while the object is at rest, without being executed.

15. A system comprising: a processor; and a memory communicatively coupled to the processor, the memory includes a rule priorities data store to maintain analytic rules that control operability of cyber-security engines installed in remotely located network devices communicatively coupled to the system, and rule prioritization logic communicatively coupled to the rule priorities data store, the rule prioritization logic being configured to (i) receive historical or realtime metadata based on cyber-security threat analyses on performed by a rule-based cyber-security engine operating in accordance with a first rule set, (ii) evaluate the historical metadata to determine one or more salient rules from a plurality of analytic rules forming the first rule set, (iii) generate a second rule set by reprioritizing one or more of the plurality of analytic rules within the first rule set from a first ordered rule sequence into a second ordered rule sequence differing from the first ordered rule sequence, the second rule set including the one or more salient rules being positioned toward a start of the second ordered rule sequence, and (iv) provide information associated with the second rule set for use by the rule-based cyber-security engine in conducting further cyber-security threat analyses.

16. The system of claim 15, wherein the second ordered rule sequence includes each of the plurality of analytic rules included in the first ordered rule sequence.

17. The system of claim 15, wherein the rule prioritization logic to receive the historical metadata by a second network device different than a first network device including the rule-based cyber-security engine.

18. The system of claim 15, wherein the rule prioritization logic to provide information associated with the second rule set comprises providing the second rule set to control analyses by the rule-based cyber-security engine on the incoming data in detecting whether the incoming data is malicious or non-malicious while achieving at least improved efficiency in the analyses of the incoming data over prior analyses by the rule-based cyber-security engine as controlled by the first rule set.

19. The system of claim 15, wherein the generate a second rule set is performed automatically based on information extracted from the historical metadata.

20. The system of claim 17, wherein the rule-based cyber-security engine is a software agent deployed within the first network device and the second rule set controls operability of the software agent in analyses of incoming data to determine whether the incoming data is a cyber-security threat.

21. The system of claim 15, wherein the rule prioritization logic to provide information associated with the second rule set by at least providing the second rule set to one or more cyber-security engines deployed within one or more network devices, including a network device including the rules-based cyber-security engine, in order to collect meta-information associated with analyses by the one or more network devices using both the first rule set and the second rule set to determine improved efficacy or efficiency in the analyses of the incoming data using the second rule set over the first rule set.

22. The system of claim 21, wherein the rule prioritization logic at least further providing the second rule set to a plurality of cyber-security engines upon confirmation, based on the meta-information associated with analyses by the one or more network devices using both the first rule set and the second rule set, that the one or more cyber-security engines are experiencing improved efficacy or efficiency in the analyses of the incoming data, the one or more cyber-security engines being a subset of the plurality of cyber-security engines.

23. A computerized method generating an improved cyber-security rule ordering for cyber-security threat detection or post-processing activities conducted by a rules-based cyber-security engine deployed within a network device, the method comprising: collecting metadata associated with analytics conducted on incoming data according to a plurality of rules arranged in a first ordered rule sequence to control operability of a rule-based cyber-security engine involved in determining whether the incoming data is a cyber-security threat; analyzing the metadata to determine one or more salient rules from the plurality of rules; and reprioritizing the plurality of rules by at least rearranging an order in processing of the plurality of rules according to a second ordered rule sequence with the one or more salient rules being positioned toward a start of the second ordered rule sequence; reconfiguring the rule-based cyber-security engine to perform analyses of subsequently received data in determining whether the subsequently received data is a cyber-security threat based on the plurality of rules controlling an order of the analyses according to the second ordered rule sequence.

24. The computerized method of claim 23, wherein the reprioritizing of the plurality of rules enables the more efficient analysis of content associated with an object by reducing the number of analysis cycles necessary by the rules-based cyber-security engine in identifying the content as malicious or non-malicious.

25. The computerized method of claim 23 further comprising performing additional reconfigurations of the rule-based cyber-security engine based on a third ordered rule sequence determined by continuing to collect the metadata associated with subsequent incoming data, analyzing the metadata and prioritizing the plurality of rules according to the third ordered rule sequence.

* * * * *